United States Patent [19]

Kawasaki

[11] Patent Number: 5,303,093
[45] Date of Patent: Apr. 12, 1994

[54] NOISE REDUCTION/ELIMINATION APPARATUS FOR USE WITH ROTARY HEAD TYPE RECORDING/REPRODUCING APPARATUS

[75] Inventor: Satoshi Kawasaki, Yokohama, Japan

[73] Assignee: Victor Company of Japan, Ltd., Yokohama, Japan

[21] Appl. No.: 708,873

[22] Filed: May 31, 1991

[30] Foreign Application Priority Data

Jun. 1, 1990 [JP] Japan ................... 2-143843
Jul. 31, 1990 [JP] Japan ................... 2-204303

[51] Int. Cl.$^5$ ............................. G11B 20/06
[52] U.S. Cl. ........................ 360/30; 360/32; 360/46; 360/53; 360/64
[58] Field of Search ............ 360/30, 64, 32, 38.1, 360/32, 46, 53

[56] References Cited

U.S. PATENT DOCUMENTS

| | | | |
|---|---|---|---|
| 4,677,621 | 6/1987 | Sato | 360/32 |
| 5,095,392 | 3/1992 | Shimazaki et al. | 360/32 |
| 5,150,050 | 9/1992 | Genheimer | 360/31 |

FOREIGN PATENT DOCUMENTS 61-236071 10/1986 Japan .
1-185882 7/1989 Japan .

Primary Examiner—Robert J. Pascal
Assistant Examiner—R. A. Ratliff
Attorney, Agent, or Firm—Jacobson, Price, Holman & Stern

[57] ABSTRACT

A noise reduction apparatus wherein a sampled digital data is compared with a first threshold value (t) to average the digital data during a period while the level of low frequency components containing jitter noises is a predetermined threshold level or lower, an averaging operation for the digital data after a predetermined number of sampling points continues if a difference value between previously and presently obtained digital data takes a second threshold value (tp) or lower, the averaged digital data obtained during a predetermined number of rotations of a rotary head is converted into an analog signal, and the analog signal is subtracted from a reproduced signal.

10 Claims, 16 Drawing Sheets

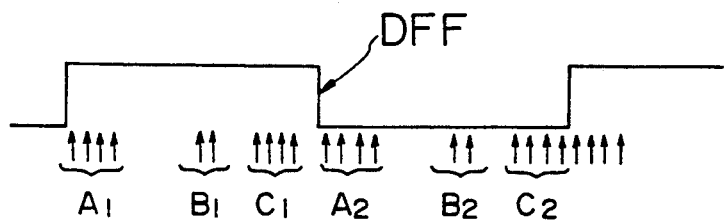
FIG. 10
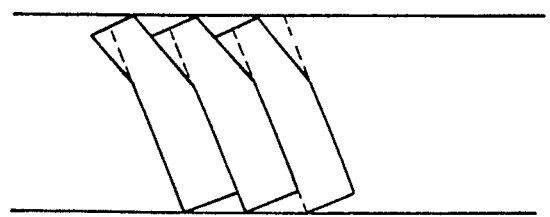
FIG. 11
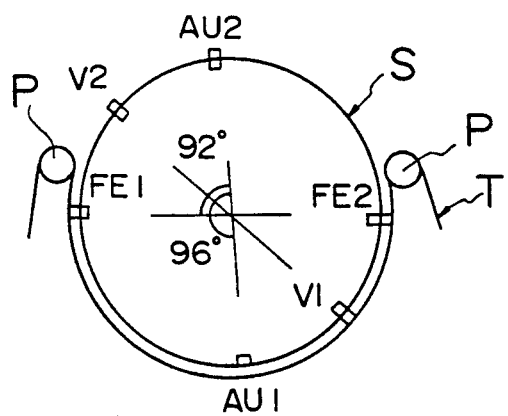 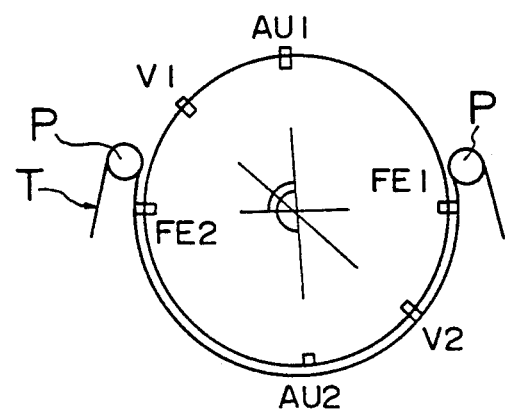
FIG. 12A      FIG. 12B

NOISE REDUCTION/ELIMINATION APPARATUS FOR USE WITH ROTARY HEAD TYPE RECORDING/REPRODUCING APPARATUS

BACKGROUND OF THE INVENTION

The present invention relates to a noise reduction-/elimination apparatus particularly for use with a rotary head type recording/reproducing apparatus. More particularly, the present invention relates to a noise reduction apparatus for use with a magnetic reproducing apparatus which picks up an FM modulated audio signal on a medium by means of a rotary head, and FM demodulates the picked-up audio signal to obtain the original audio signal, the noise reduction apparatus being capable of eliminating noises (hereinafter called jitter noises) generated by jitter from the picked-up audio signal.

Recently, recording/reproducing apparatuses have been practically used which records/reproduces video and audio information by a helical scanning scheme using a rotary head.

With the recording/reproducing apparatus of this type, in recording an audio signal, for example, a carrier wave is FM modulated by the audio signal and recorded on a recording medium such as a magnetic tape. In reproducing the original audio signal, the recorded signal is picked up from the recording medium and FM demodulated to obtain the original audio signal.

If the rotation locus of the tip of a magnetic head is a circle having a perfect roundness, the same FM modulated audio signal can be recorded and picked up even by using two different recording/reproducing apparatuses.

However, if the rotation locus of the tip of a magnetic head is not a perfect circle, frequency fluctuation is produced in both recorded and picked-up signals. Such a case will be described with reference to FIG. 1.

In FIG. 1, magnetic heads Ha and Hb are symmetrically mounted on a rotary head cylinder (hereinafter called simply a rotary cylinder) S with respect to the center O of the rotary cylinder. The rotary cylinder S rotates in the X arrow direction about its rotation center O', while a magnetic tape T runs herically in the Y arrow direction in contact with the outer periphery of the rotary cylinder S. It is assumed that the rotation center O' is eccentric by $\Delta x$ from the center O. The fluctuation ratio $\Delta v$ of a relative velocity of the magnetic head Ha is given by the following equation:

$$\Delta v = (r - \Delta x)/r \quad (1)$$

where r represents the radius of the rotary cylinder S.

The frequency shift $\Delta f$ of a recorded signal caused by the relative velocity fluctuation is given by the following equation:

$$\Delta f = f0/\Delta v - f0 \quad (2)$$

Since the two magnetic heads Ha and Hb mounted on the rotary cylinder S are alternately switched between consecutive recording tracks, the actual frequency shift amount becomes $2\Delta f$. Assuming that the radius of the rotary head S is r=31 mm and the eccentric displacement is $\Delta x=5$ μm, then it becomes $\Delta v=0.9998387$. If the frequency of a recorded signal is f0=1.7 MHz, the frequency shift amount becomes $\Delta f=274$ Hz so that the recorded signal is always subject to the frequency shift $2\Delta f=548$ Hz.

Assuming that the standard frequency shift of an FM modulated audio signal is $+/-$ 50 KHz, the frequency shift $2\Delta f=548$ Hz corresponds to $-45.2$ dB of the standard frequency shift.

In other words, if the rotary cylinder S has an eccentric displacement 5 μm, unnecessary signal of $-45.2$ dB is always superposed upon the signal reproduced from an FM modulated audio signal having the standard frequency shift.

Such frequency fluctuations are canceled out if the same magnetic recording/reproducing apparatus is used for both recording and reproducing, thereby posing no problem. However, if different magnetic recording/reproducing apparatuses are used, the fluctuation during recording is added to the fluctuation during reproducing, two-folding the fluctuation at the worst. Such a fluctuation is called jitter which is outputted as noises of a reproduced audio signal, thereby deteriorating the commercial value of a recording/reproducing apparatus.

One of conventional noise reduction apparatuses is disclosed, for example, in Japanese Patent Laid-open Publication No. 61-236071. The outline of this apparatus will be described with reference to a block diagram of FIG. 2 and timing charts of FIGS. 3 and 4.

An audio signal obtained through FM demodulation is inputted to an input terminal 1 and supplied to a band-pass filter (BPF) 2 having a passband between, e.g., 30 and 500 Hz. The band-passed audio signal is supplied via a sample-hold (S/H) circuit 4 to an analog-digital (A/D) converter 5. A digital data outputted from the A/D converter 5 is applied to a terminal a of a first switch SW1. The first switch SW1 has two contacts b and c to which a first random access memory (RAM) 7 and a second RAM 8 are connected respectively, so that the digital data is written in either RAM 7 or RAM 8 depending upon the switching state of SW1. RAM 7 and RAM 8 are connected to contacts e and f of a second switch SW2 so that a digital data is read from either RAM 7 or RAM 8 depending upon the switching state of SW2, and applied via a contact d to one input of a comparison gate circuit 6. Applied to the other input terminal of the comparison gate circuit 6 is the digital data outputted directly from the A/D converter 5. Outputs of the comparison gate circuit 6 are applied to a comparison circuit 13.

A synchronous pulse signal Ps, e.g., of 30 Hz, synchronous with the rotation of the rotary cylinder S is supplied to an input terminal 9 to generate a clock pulse signal $CK_1$ of 1.2 KHz frequency-multiplied by 40 by a phase locked loop (PLL) 10 and timing counter 11. This clock pulse signal $CK_1$ is supplied to the A/D converter 5 as its sample timing signal. The clock pulse $CK_1$ and synchronous pulse signal Ps are supplied to a control circuit 12, with a comparison result signal (error signal) of the comparison circuit 13 being also supplied thereto. The control circuit 12 supplies a control signal X to the first RAM 7 and another control signal Y complementary to the control signal X to the second RAM 8. The control signal X changes its level alternately with the synchronous pulse signal Ps in the ordinary state, and does not change its level when an error signal is supplied from the comparison circuit 13. The control circuit 12 supplies a control signal Z to the switch SW1, and supplies via an inverter 14 a signal complementary to the control signal Z to the switch SW2. The control signal Z changes its level with the synchronous pulse signal Ps.

When the output of the control signal Z takes a high level "H", as shown in FIG. 2, the contacts a and b of the switch SW1 are connected together, whereas the contacts f and d of the switch SW2 are connected together. On the contrary, when the output of the control signal Z takes a low level "L", the contacts a and c of the switch SW1 are connected together, whereas the contacts e and d are connected together, taking the reverse state shown in FIG. 2.

While the N-th order data shown in FIG. 3(b) is outputted from the A/D converter 5 synchronously with the synchronous signal Ps shown in FIG. 3(a), the control circuit 12 outputs the control signal Z of "H" level. During this period, the control signal X of "L" level shown in FIG. 3(f) is supplied to the first RAM 7, so that the N-th data is written in RAM 7 via the switch SW1 as shown in FIG. 3(g). The control signal Y of "H" level shown in FIG. 3(h) is supplied to the second RAM 8, so that the (N-1)-th data already written is read from RAM 8 via the switch SW2. The read-out data is supplied to the one input of the comparison gate circuit 6 as described previously. During this period, the N-th data is supplied from the A/D converter 5 to the other input of the comparison gate circuit 6. These two data are supplied to the comparison circuit 13 from the comparison gate circuit 6 which operates in response to the inverted clock pulse CK(IV)1.

FIG. 4 illustrates the operation of the comparison circuit 13. It is assumed that data indicated by the solid line in FIG. 4(b) are sequentially supplied synchronously with the synchronous pulse signal Ps shown in FIG. 4(a). If the data to be compared exceeds a threshold value t indicated by broken lines in FIG. 4(b), an error signal of "L" level is supplied to the control circuit 12. Accordingly, during the period while the N-th data is outputted from the A/D converter 5, if a difference from the (N-1)-th data is equal to or smaller than the threshold value t, a signal of "H" level from the comparison circuit 13 is supplied to the control circuit 12. During this period, the (N-1)-th data is converted into a complement (1's complement) signal by a complement circuit 15 and supplied to a D/A converter 17. Namely, a digital signal processing of obtaining a signal having an inverted phase of the input signal is carried out, and the obtained signal is supplied to the D/A converter 17. Supplied to this D/A converter 17 is the clock pulse signal CK(IV)₁ whose level has been inverted by an inverter 16. The D/A converter 17 converts the input data into an analog signal. This analog signal is then applied to an adder 3 via a low-pass filter (LPF) 18 for eliminating high frequency components of the analog signal. In the meantime, the audio signal applied to the input terminal 1 is delayed by a delay circuit 19 by one period of the clock pulse signal CK(IV)₁, and applied to the adder 3. As a result, the adder 3 removes noises from the (N-1)-th audio signal and outputs it from an output terminal 20.

As shown in FIG. 3 (a) and (b), if an error er1 is detected regarding the (N+1)-th data outputted from the A/D converter 5, the comparison circuit 13 supplies a signal of "L" level to the control circuit 12. Therefore, when the (N+2)-th data is outputted from the A/D converter 5, the levels of the control signals X and Y of the control circuit 12 take the same levels as those when the (N+1)-th data was outputted from the A/D converter 5. Accordingly, the N-th data read from RAM 7 and the (N+1)-th data outputted from the A/D converter 13 are applied to the comparison circuit 13, and the N-th data is D/A converted and supplied to the adder 3.

In the above way, when excessive noise components are detected, the previous data is used thereby eliminating jitter noises.

The above-described conventional noise reduction apparatus extracts jitter noise by using BPF 2 having the passband between 30 and 500 Hz. However, audio signal components about ten times as much as jitter noises are often present within this band. With the conventional apparatus, these audio signal components are assumed as jitter noises during the reduction process of noises, resulting in a low reliability.

SUMMARY OF THE INVENTION

The present invention has been made in consideration of the above circumstances. It is an object of the present invention to provide a noise reduction apparatus capable of reliably eliminating jitter noises without erroneous operation even if audio signals and other noises are contained in the frequency band where most of jitter noises are included, and capable of reliably eliminating jitter noises even if a noise pattern changes during signal reproduction.

In order to achieve the above object of the present invention, there is provided a noise reduction apparatus wherein during a period while the level of low frequency components containing jitter noises take a threshold value or lower, a sampled digital data is compared with a threshold value (t) to average the digital data. An averaging operation for the digital data after a predetermined number of sampling points continues only if a difference value between previously and presently sampled digital data is equal to or lower than a threshold value (tp). The averaged data obtained during a period corresponding to a predetermined number of head rotations is converted into an analog data which is subtracted from a reproduced signal.

There are provided first and second RAMs for storing the averaged digital data. The first RAM stores the averaged digital data previously obtained during the period corresponding to the predetermined number of rotations. While the digital data in the first RAM is outputted, the second RAM stores the averaged digital data presently obtained during the period corresponding to the predetermined number of rotations. The sum of differences between the previous digital data in the first RAM and the present digital data in the second RAM at each of the sampling points is calculated. The contents of the second RAM are copied to the first RAM if the sum exceeds an error judgment threshold value (Vth).

It is preferable that the error judgment threshold value be changed in accordance with the number of sampling points at which the sampled digital data exceeds the threshold values (t and tp), or in accordance with the number of rotations of the rotary head having a sampling point exceeding the threshold values (t and tp).

Furthermore, if the rotary head reproduces a plurality channel of modulated signals at the same time, an averaging operation is carried out using one of the channels. The obtained data level is adjusted and subtracted from each channel reproduced signal.

More specifically, the noise reduction apparatus of the present invention can be realized by the following various aspects.

According to the first aspect of the present invention, there is provided a noise reduction apparatus for a magnetic recording/reproducing apparatus wherein a particular carrier is FM modulated by an audio signal and signal recording on a recording medium is reproduced using a rotary head, the noise reduction apparatus comprising:

a low-pass filter for extracting low frequency components of a reproduced FM demodulated signal;

a level detector for detecting a level of an output signal from the low-pass filter and generating a binary control output in accordance with whether the detected level is equal to or higher than a predetermined level or the detected level is lower than the predetermined level;

a timing signal generator for generating a timing signal synchronous with the rotation of a rotary head;

a processing circuit comprising first to fifth means, the first means responsive to the control output corresponding to a level lower than the predetermined level supplied from the level detector, operating to sample an output signal level from the low-pass filter at the timing signal from the timing signal generator while limiting the output signal within a first level range, to convert the sampled signal into a digital data, and to store in a first memory the result of an averaging operation between previously and presently sampled and converted the digital data at each sampling point during a period until a predetermined number of timing signals has been entered, the second means operating, after the predetermined number of timing signals has been entered and if a difference between the result of the averaging operation obtained from the first means and the digital data sampled at the following sampling signal from the timing signal generator is within a second level range narrower than the first level range, to store in the first memory the result of an averaging operation between previously and presently sampled and converted the digital data; the third means responsive to the control output corresponding to a level lower than the predetermined level supplied from the level detector, operating to sample an output signal level from the low-pass filter at the timing signal from the timing signal generator while limiting the output signal within the first level range, to convert the sampled signal into a digital data, and to store in a second memory the result of an averaging operation between the previously and presently sampled and converted the data at each sampling point during the period until the predetermined number of timing signals has been entered, the fourth means operating, after the predetermined number of timing signals has been entered and if a difference between the result of the averaging operation obtained from the third means and the digital data sampled at the following sampling signal from the timing signal generator is within the second level range narrower than the first level range, to store in the second memory the result of an averaging operation between the previously and presently sampled and converted digital data, and the fifth means operating, if a difference between the data stored in the first and second memories is large, to copy the data in the second memory to the first memory;

a converter for reading the result of an averaging operation stored in the first memory of the processing circuit at the timing signal from the timing signal generator, and converting the read-out signal into an analog signal; and a synthesizing circuit for synthesizing a signal from the converter with the reproduced FM modulated signal to thereby reduce noise components contained in the FM modulated signal.

According to the second aspect of the present invention, the fifth means of the processing circuit of the first aspect calculates a difference value between the data stored in the first and second memories at each sampling point synchronous in phase with the rotation of a rotary head, and if there is a predetermined number or more of the calculated difference values at which the difference value exceeds a particular threshold value, the data in the second memory is copied to the first memory.

According to the third aspect of the present invention, the fifth means of the processing circuit of the first aspect calculates a difference value between the data stored in the first and second memories at each sampling point synchronous with the timing signal, if the sum of the difference values exceeds a particular threshold value, the data in the first and second memories is reset, and the first to fourth means are caused to repetitively perform a predetermined operation.

Lastly, according to the fourth aspect of the present invention, the fifth means of the processing circuit of the first aspect calculates a difference value between the data stored in the first and second memories at each sampling point synchronous with the timing signal, and if there is a predetermined number or more of the difference values exceeding a particular threshold value, the first to fourth means are caused to repetitively execute a predetermined operation.

According to the present invention, an averaging operation is executed only if the level of low frequency components is equal to or lower than a threshold level, reliably rejecting an audio signal having an amplitude several times as large as that of jitter noises. Furthermore, the sampled data is limited by the threshold values t and tp, suppressing the influence of instantaneous signals and noises.

A data averaging operation is repeated. If there is a large difference between previous and present averaged data, the present data is preferentially adopted, enabling to eliminate jitter noises based upon the latest data.

The error judgment threshold value used for the judgment if the present data is preferentially used or not is changed in accordance with the number (m) of sampling points at which the sampled digital data exceeds the threshold values (t and tp), or in accordance with the number (n) of rotations of the rotary head having a sampling point exceeding the threshold values (t and tp). Therefore, it is possible to prevent an erroneous operation which might otherwise caused by audio signals and other noises, eliminating jitter noises in accordance with a change of a jitter noise pattern.

Furthermore, if the rotary head reproduces a plurality channel of modulated signals at the same time, an averaging operation is carried out using one of the channels. The obtained data level is adjusted and subtracted from each channel reproduced signal. Therefore, it is not necessary to provide an averaging circuit for each channel, resulting in a simple circuit arrangement.

According to the noise reduction apparatus of the first aspect, the first and second means of the processing circuit operates such that if the level of the FM demodulated signal outputted from the low-pass filter is lower than a predetermined level, the signal is sampled and converted into a digital data. The result of an averaging operation between previously and presently sampled and converted digital data at each sampling point during a period until a predetermined number of timing signals has been entered, is stored in the first memory.

Similarly, the third and fourth means operates such that if the level of the FM demodulated signal outputted from the low-pass filter is lower than a predetermined level, the signal is sampled and converted into a digital data. The result of an averaging operation between previously and presently sampled and converted digital data at each sampling point during a period until a predetermined number of timing signals has been entered, is stored in the second memory.

A difference value is obtained between the data stored in the first and second memories at each sampling point synchronous in phase with the rotation of the rotary head, and if the sum of difference values exceeds a particular value, the data in the second memory is copied to the first memory.

As a result, the signal components stored in the first memory converge into a constant noise pattern synchronous with the rotation of the rotary head drum.

The data stored in the first memory is read at a timing signal synchronous with the rotation of the rotary head, and converted into an analog signal which is then combined with a reproduced FM demodulated signal.

As a result, noise components in the FM demodulated signal generated during the recording/reproducing process are canceled, reducing jitter noises.

According to the noise reduction apparatus of the second aspect, there is calculated a difference value between the data stored in the first and second memories at each sampling point synchronous in phase with the rotation of a rotary head, and if there is a predetermined number or more of the calculated difference values at which the difference value exceeds a particular threshold value, the data in the second memory is copied to the first memory.

The data stored in the first memory is read at a timing signal synchronous with the rotation of the drum, and converted into an analog signal which is then combined with a reproduced FM modulated signal.

According to the noise reduction apparatus of the second aspect, a cancel signal can be generated effectively when a noise output pattern changes. Even if the sum of noises is not large but several sampling points have large noises, it is possible to effectively suppress the generation of noises.

According to the noise reduction apparatus of the third aspect, there is calculated a difference value between the data stored in the first and second memories at each sampling point synchronous with the timing signal, if the sum of the difference values exceeds a particular threshold value, the data in the first and second memories is reset, and the first to fourth means are caused to repetitively perform a predetermined operation. Therefore, a noise cancel signal can be generated at particular points where heads are selectively switched or where a so-called head tapping phenomenon occurs. As a result, the capacity of RAMs used in a control circuitry can be reduced.

According to the noise reduction apparatus of the fourth aspect, there is calculated a difference value between the data stored in the first and second memories at each sampling point synchronous with the timing signal, and if there is a predetermined number or more of the difference values exceeding a particular threshold value, the first to fourth means are caused to repetitively execute a predetermined operation.

As a result, a noise cancel signal can be generated at particular points where heads are selectively switched or where a so-called head tapping phenomenon occurs. In addition, similar to the case of the noise reduction apparatus of the second aspect, the generation of noises can be suppressed if large errors are concentrated on several particular sampling points.

As described so far, according to the noise reduction apparatus of the present invention, an averaging operation is repeated under the condition that the level of low frequency components is equal to or lower than a threshold level. If there is a large difference between previous and present averaged data, the present data is preferentially adopted. As a result, noises generated in a reproduced signal can be effectively eliminated for the various cases. For example, the case where different tape speed modes (SP, EP) are used in recording, the case where a jitter noise pattern changes because of a change of a reproducing position at the start and end portion of a tape, or the case where there are different noise patterns because signals are recorded in a tape using a plurality of VTRs. Furthermore, if a circuit portion for detecting if a difference value between previous and present averaged data is large or not, is used only to particular points where a time axis fluctuation is likely to occur, the capacity of a memory used for detecting such a noise pattern change can be reduced.

BRIEF DESCRIPTION OF THE DRAWINGS

In the accompanying drawings:

FIG. 10 is a diagram showing a relationship between a drum pulse and sampling points;

FIG. 11 is a schematic diagram showing a magnetic tape used for explaining fluctuation of a magnetic reproducing apparatus;

FIGS. 12A and 12B are diagrams used for explaining the operation of a rotary head of a magnetic reproducing apparatus;

DETAILED DESCRIPTION OF THE PREFERRED EMBODIMENTS

Figure 1:
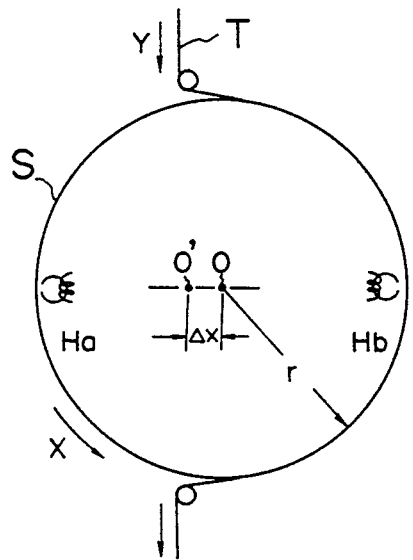
FIG. 1 is an illustrative diagram used for explaining generation of jitter noises.
Figure 2:
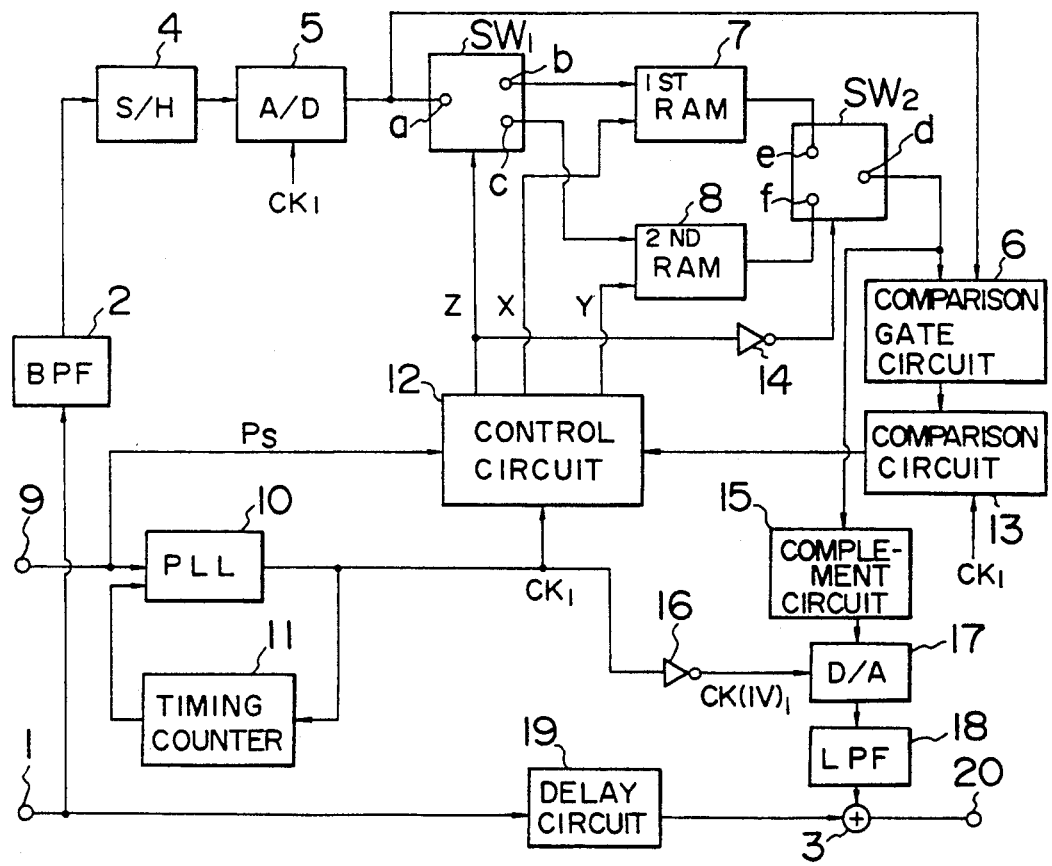
FIG. 2 is a block diagram showing the structure of a conventional noise reduction apparatus.
Figure 3:
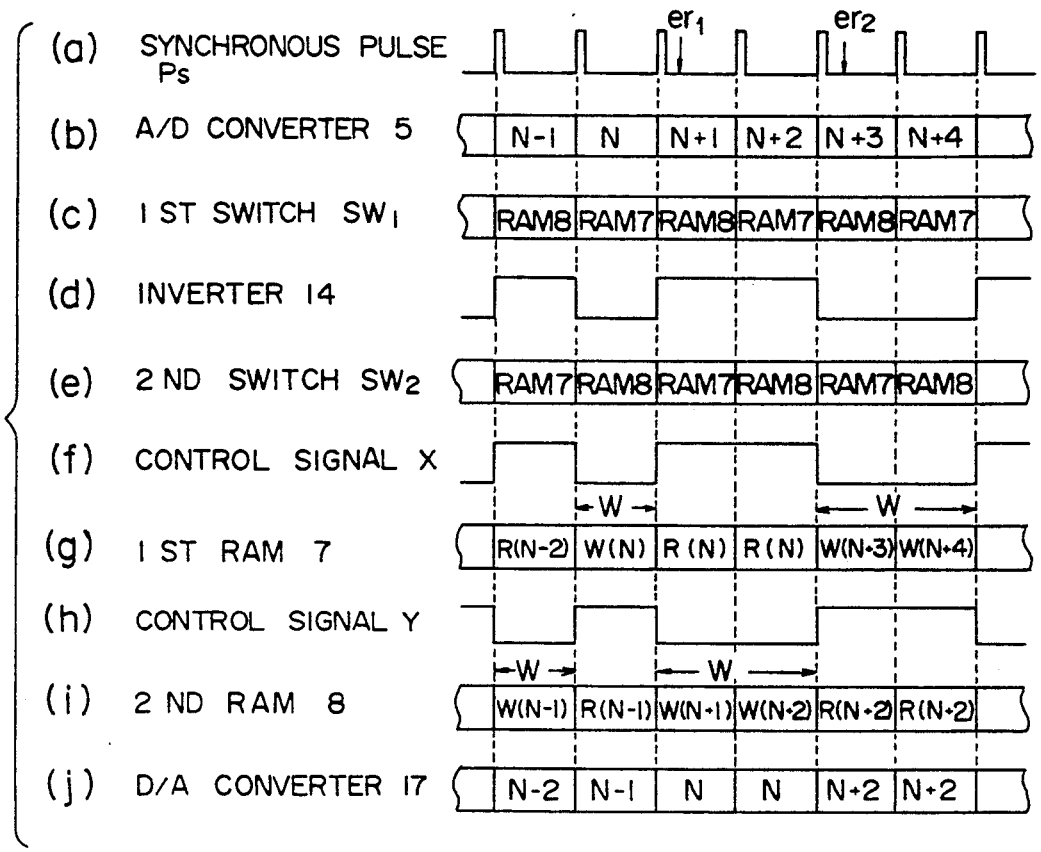
FIG. 3 is a timing chart used for explaining the operation of the conventional apparatus shown in FIG. 2.
Figure 4:
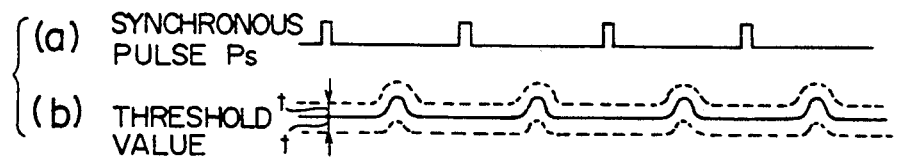
FIG. 4 shows waveforms used for explaining the operation of the conventional apparatus shown in FIG. 2.
Figure 5:
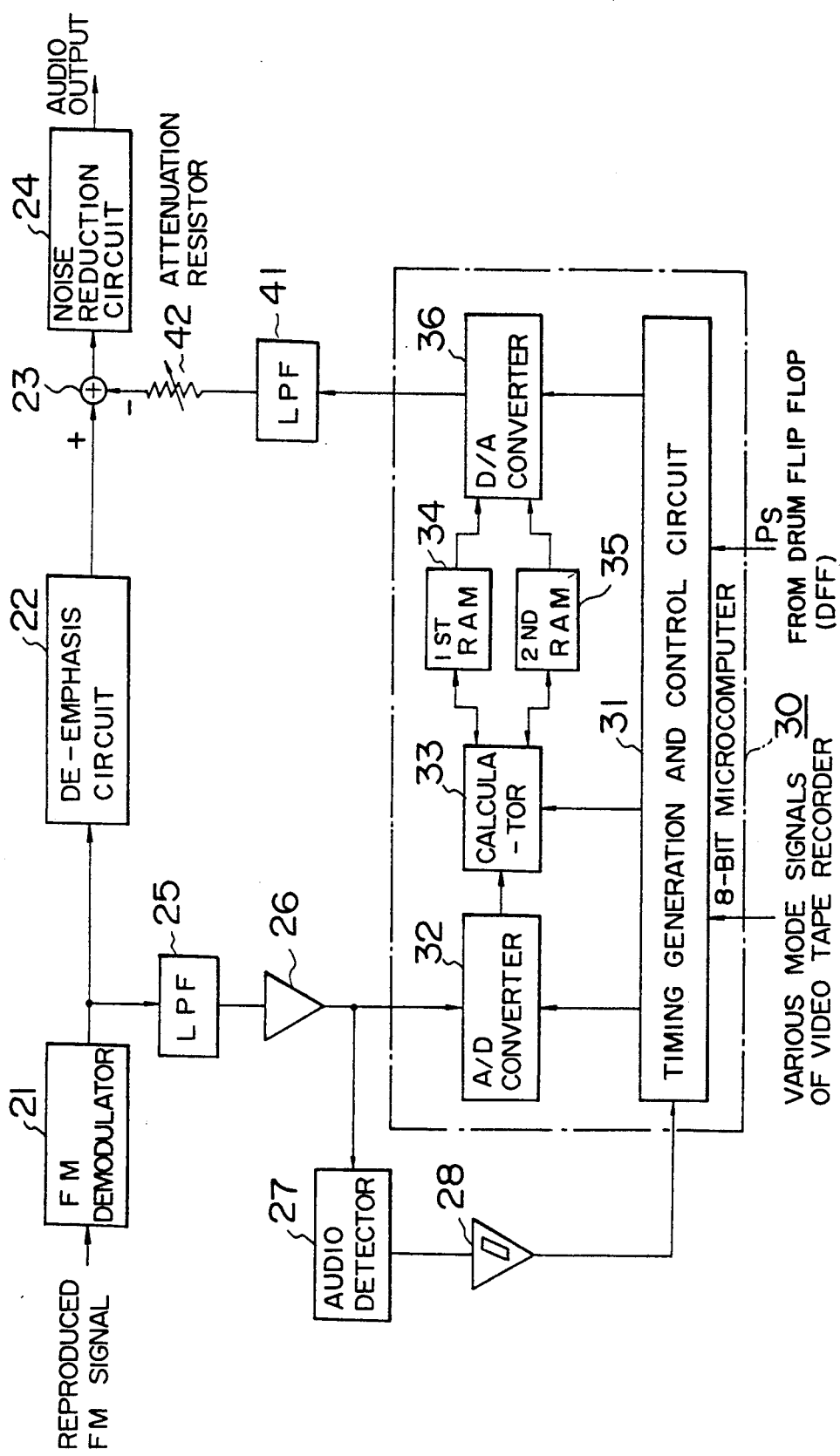
FIG. 5 is a block diagram showing the structure of a noise reduction apparatus according to a first embodiment of the present invention.

FIG. 5 is a block diagram showing the structure of the first embodiment of the present invention. In FIG. 5, an FM modulated signal reproduced by magnetic heads are caused to have a constant amplitude by a limiter (not shown), and applied to an FM demodulator 21 whereat it is demodulated to obtain a reproduced audio signal. The pre-emphasized high-frequency components of the reproduced audio signal are suppressed by a de-emphasis circuit 22, and applied to one input of an adder 23. Applied to the other input of the adder 23 is an inverted signal of jitter noises to be described later. The adder 23 therefore operates as a subtraction means. An output of the adder 23 is supplied to a noise reduction circuit 24 which suppresses noises and outputs an audio signal with an improved SN ratio.

The reproduced audio signal outputted from the FM demodulator 21 is applied to an amplifier 26 via a low-pass filter (first LPF) 25 having a cut-off frequency 2 kHz. LPF 25 extracts low-frequency components containing much jitter noise components. The amplifier 26 amplifies the low-frequency components, e.g., by a factor of one hundred and several tens times, and applies the low frequency components to an audio detector 27 and an 8-bit microcomputer 30. The audio detector 27 detects the low-frequency components and inputs the detected signal to a level detector 28. The level detector 28 compares the input signal level with a reference signal level which is several times as large as a jitter noise level. The level detector outputs a signal of a high level "H" when the input signal level is smaller than the reference signal level. The 8-bit microcomputer 30 is constructed of a timing generation and control circuit 31, an A/D converter 32, a calculator 33, first and second RAMs 34 and 35, and a D/A converter 36. The timing generation and control circuit 31 receives an output signal from the level detector 28, various mode signals of a video tape recorder (VTR), and a synchronous pulse signal Ps, and generates a timing signal and a control signal. The A/D converter 32 samples and converts an output signal from the amplifier 26 into a digital signal in response to the timing signal. The calculator 33 averages an output data of the A/D converter 32 only when the level detector 28 outputs an "H" signal. The first and second RAMs 34 and 35 are used for the averaging operation which is performed over a number of rotations of the rotary cylinder for each sampling point. The D/A converter 36 converts the data stored in RAMs 34 and 35 into an analog signal.

In the 8-bit microcomputer 30 whose detailed operation will be later described with reference to the flow charts of FIGS. 6A and 6B, the averaged data are outputted at the timing when jitter noises are to be eliminated from a reproduced signal, to a second low-pass filter (second LPF) 41 and to an attenuation resistor 42. The attenuation resistor 42 is used to attenuate the output averaged data by the amount corresponding to the amplification by the amplifier 26. The averaged and attenuated data are supplied to the other input of the adder 23.

Next, the detailed description of the operation of the 8-bit microcomputer 30 will be given with reference to the flow charts shown in FIGS. 6A and 6B.

When a reproduction start signal is supplied, a recording/reproducing apparatus is set to a reproduction mode and the reproduction operation starts (step ST1). The first and second RAMs 34 and 35 are reset to be initialized (step ST2). Then, an averaging routine starts upon interruption by the synchronous pulse signal Ps from a drum flip-flop (DFF) (step ST3).

In the averaging routine, it is judged from an output of the level detector 28 if there are low-frequency components in the demodulated signal exceeding the reference signal level (step ST4). If the low-frequency components are smaller than the reference signal level, the sampling by the A/D converter 32 starts (step ST5). In this manner, the sampling at a first sampling point is allowed to start only when the low-frequency components of the reproduced signal are smaller than the reference level set at the level detector 28. Therefore, an averaging operation for an audio signal having an amplitude several times as large as jitter noises can be avoided, thereby improving the reliability.

Figure 7:
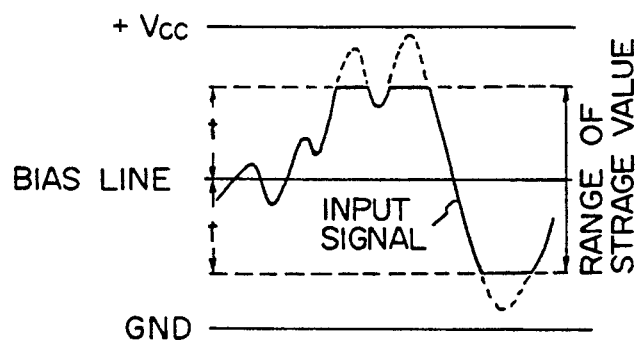
FIGS. 7 and 8 are diagrams used for explaining the operation of the first embodiment apparatus.

Next, it is judged if the number of averaging operations (times of rotations) is equal to or larger than a preset number, e.g., five (step ST6). In this case, a sampling data obtained before the rotation number of the rotary head reaches the preset number is judged if it is within the range of +/− t threshold values set at higher and lower levels of a reference bias (step ST7). As shown in FIG. 7, the threshold values t are set, e.g., to about +/− 1.5 volt relative to the reference bias if the power supply voltage Vcc of the A/D converter 32 is 5 volt. If a sampled data exceeds this range, the amplitude thereof is limited to 2.5 V +/− t (step ST8) and then averaged with the previously averaged value of the first sampling point. If not, the sampled value itself is averaged with the previously averaged value and stored in the first RAM 34 (step ST11). This averaging operation is carried out by the following equation.

$$\{(X)_{N-1} \times (N-1) + D_N\}/N \qquad (3)$$

where $(X)_{N-1}$: the previously averaged value $D_N$: a current sampled data, and N: the number of averaging operations at a present sampling point.

Figure 8:
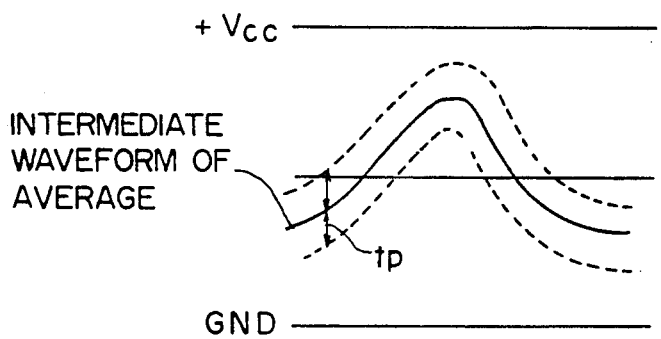

A value limited to the threshold value t is stored in the first RAM 34 at the first time. At the second and following times, the averaged data is stored in the first RAM 34. The above averaging operation is repeated at the sampling period provided by a built-in timer. If the number of times at each sampling point exceeds the preset number, the presently sampled data is compared with the previous averaged data (step ST9) to judge if a difference therebetween exceeds threshold values +/- tp as shown in FIG. 8 (step ST10). If it exceeds the threshold value, the presently sampled data is aborted and the next sampling time is waited for. If not, the presently sampled data is used as an element of the averaging operation by the equation (3), and the averaged value is stored in the first RAM 34. The threshold values +/− tp are set, e.g., to +/−0.5 V.

It is then checked if the number of averaging operations has reached a predetermined final sampling point, e.g., the last 160-th during one rotation of the rotary head (step ST12). If not, the control advances to step ST13 whereat the sampling period is set by the built-in timer to repeat the steps ST4 to ST12 for the next sampling point. If the low-frequency components exceed the reference signal level at step ST4 or if the difference is not within the threshold values +/- tp, the control immediately advances to the judgment step ST12. It is then checked if the number of times of the averaging operations corresponding to the 50 rotations of the rotary head have been completed. If completed, the averaging routine terminates (step ST14).

Signals having an instantaneous large amplitude or noises caused by drop-out are also sampled because the time constant of the audio detector 27 does not allow to detect them. However, these signals and noises can be excluded by the limitations of threshold values +/− t or +/− tp. The low-frequency components inputted to the 8-bit microcomputer 30 are converged, by the averaging operations, generally into a constant noise pattern synchronous with the rotation of the rotary head.

Next, upon interruption using the synchronous pulse signal Ps, an output routine starts for outputting the averaged data at respective sampling points stored in the first RAM 34 (step ST15). The read timing interval is same as the sampling period of the A/D converter 32. However, considering the delays at LPF 25 and LPF 41, the data read starts not from an address [00] H of the first RAM 34, but from an address [02] H. Namely, a timing delayed by several hundreds μsec is set (step ST16). The read-out data is converted by the D/A converter 36 into an analog signal which is then outputted from the microcomputer 30.

While the averaged data is being outputted from the first RAM 34, the presently inputted data from the amplifier 26 is subjected to quite the same averaging operation described above and stored in the second RAM 35 (steps ST18, 23 to 28).

Next, based upon the synchronous pulse signal Ps, the latest jitter noise data stored in the second RAM 35 is compared with that in the first RAM 34 at each of the same addresses to obtain the sum of differences (step ST29). It is checked if the sum exceeds an error judgment threshold value Vth (step ST30). If not, it is considered that both the jitter noise data have substantially a similar nature, and the contents of the second RAM 35 are cleared. Thereafter, the output routine is again started to repeat the above steps ST15 to ST30. On the contrary, if the sum of differences exceeds the threshold value Vth, it is considered that the jitter noise pattern has changed. In this case, the data in the second RAM 35 is moved to the first RAM 34 (step ST31), and the contents of the second RAM 35 are cleared to repeat the steps ST15 to ST30.

Since a jitter noise pattern can be checked in the above manner, a change of a reproduction mode and a change of tension of a tape due to a change of the tape reproduction position can be dealt with readily. Furthermore, a change of a noise pattern on a tape recorded by using a plurality of recording apparatuses can also be dealt with readily.

FIG. 7 illustrates how the input signal level is limited within the first range of +/− t.

In FIG. 7, Vcc represents an operating power source level, e.g., 5 V, and GND represents a reference potential 0 V. The bias line is set to the middle level 2.5 V, and the values t are set to +/− 1.5 V slightly larger than the jitter noise level amplified by the amplifier 26. Accordingly, the input signal is limited within 2.5+/−1.5 V and stored in the first memory 34.

With the above arrangement, the inputted low frequency components are converged generally in a constant noise pattern synchronous with the rotation of the rotary head. Noises caused by signals disturbed by instantaneous drop-out or the like can be excluded to some degree by the limiter effect of the threshold values +/− t.

After the predetermined number of timings signals has been supplied, the averaging operation is carried out only in the case where the difference between the sampled data and the previously averaged data is within the second range of +/− tp narrower than the first range +/− t.

FIG. 8 illustrates the second range +/− tp wherein the solid line waveform represents an intermediate average of the jitter noise data, and the values +/− tp are set to +/− 0.5 V.

With this threshold value setting, it is possible to suppress the influence of noises and instantaneous signals in excess of +/− tp, and to correctly extract a jitter noise pattern.

The data obtained in the above manner is stored in the first RAM 34, and read at the same timings as the sampling timings, by using signal obtained from the timing generation and control circuit 12. The data read phase is advanced by several hundreds μsec, considering the delay characteristics of LPFs 25 and 41, for example by starting the read-out not from an address [00] H but from an address [02] H, thereby allowing a real time processing.

Figure 9A:
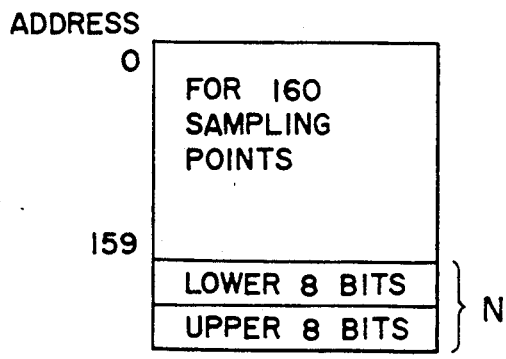
FIGS. 9A and 9B are schematic diagrams illustrating RAMs constituting the first embodiment apparatus.
Figure 9B:
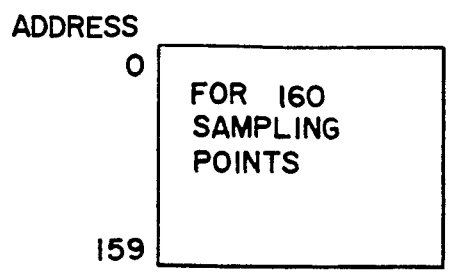

FIGS. 9A and 9B are memory maps for the first and second RAMs 34 and 35, respectively. The storage area of each of the memories from address 0 to address 159 is used for storing 160 sampled data. A pair of upper 8 bits and lower 8 bits is reserved for counting the number of times of the averaging operations in the first RAM 34.

In the above embodiment, the averaging operation is carried out at approximately uniform timings per one rotation of the rotary head (e.g., 160 points per one period).

The timings of the averaging operation at the output routine may be limited, and the similar operation to the averaging routine may be carried out at the limited timings.

FIG. 10 illustrates the operation of a drum flip-flop (DFF) for the generation of drum rotation pulses. The edge of a signal from DFF represents a point at which the heads are selectively switched.

It is a general tendency that the time axis changes discontinuously before and after the switching of heads (A1, C1, A2, C2), and errors are likely to be detected at such change points. The reason for this will be described with reference to VTR record tracks shown in FIG. 11. Correct VTR record tracks are formed linearly as shown by broken lines in FIG. 11. However, in most cases, it is difficult for VTRs to form linear tracks, so tracks as indicated by solid lines are formed. For the VTR helical scan, an inclined tape guide is mounted on a cylinder about which a tape is partially wound. The linearity of the tape guide has a limited precision. As shown in FIG. 11, the non-linear record track pattern is likely to occur at the upper or lower end portion of a tape. The nonlinear track indicated by the solid line poses no problem if the same VTR is used both for the recording and reproducing. However, there occurs a problem if the track is reproduced by a VTR different from the VTR which recorded the track. Namely, since the rotary head is rotates at a constant angular velocity, the relative speed between the tape and the head changes with the nonlinearity of the track. The relative speed becomes therefore discontinuous at the upper or lower end portion of the tape, thereby resulting in a discontinuous change of jitter noises.

In the first embodiment, the threshold value Vth for judging if the jitter noise pattern has changed or not is fixed. From the viewpoint of dealing with a jitter noise pattern change, it is more effective to change the threshold value Vth if the low frequency components contain many signals other than jitter noises.

Figure 13A:
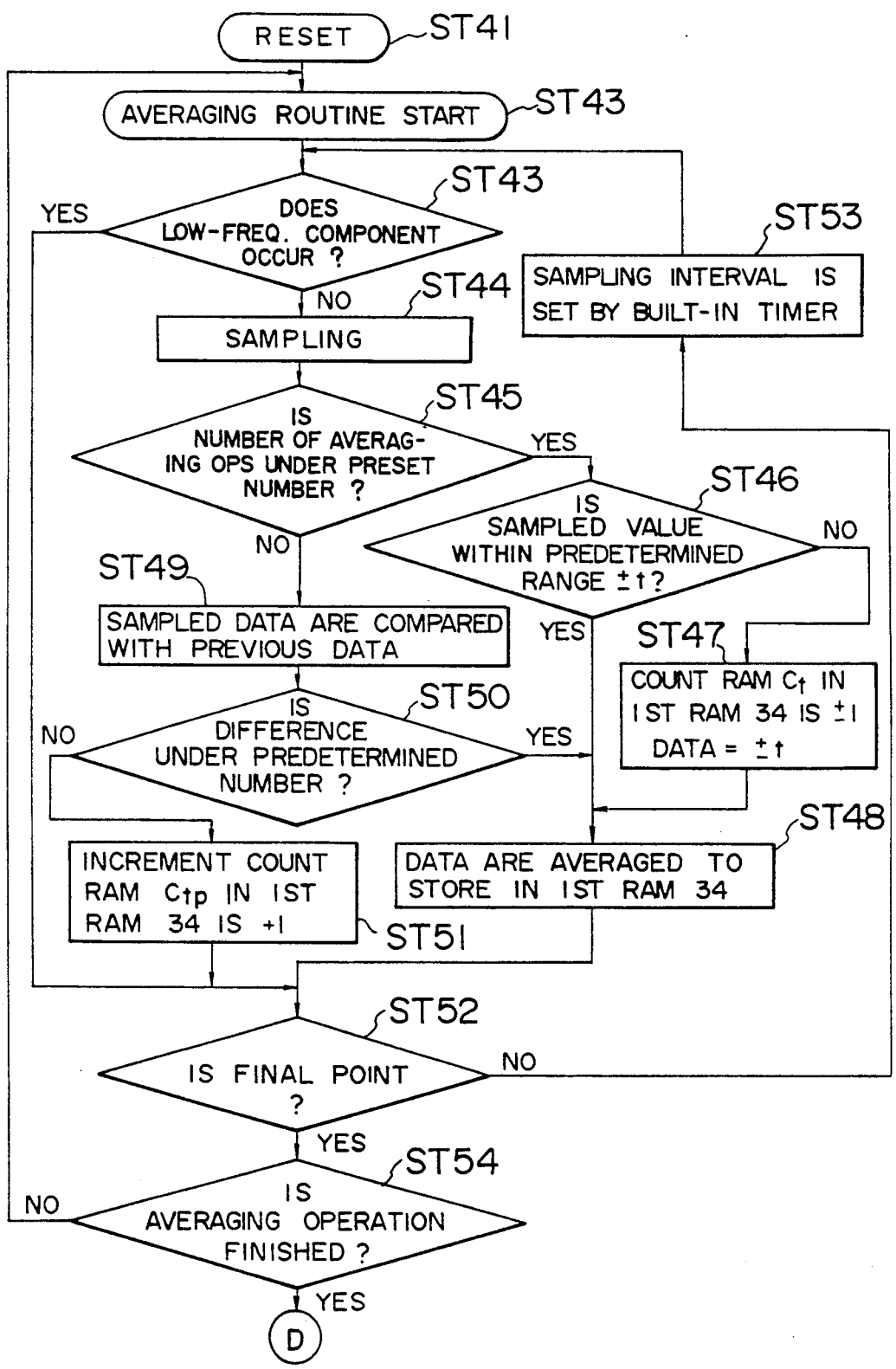
FIGS. 13A to 13C are flow charts illustrating the operation procedure by a microcomputer constituting the main part of a noise reduction apparatus according to a second embodiment of the present invention.
Figure 13B:
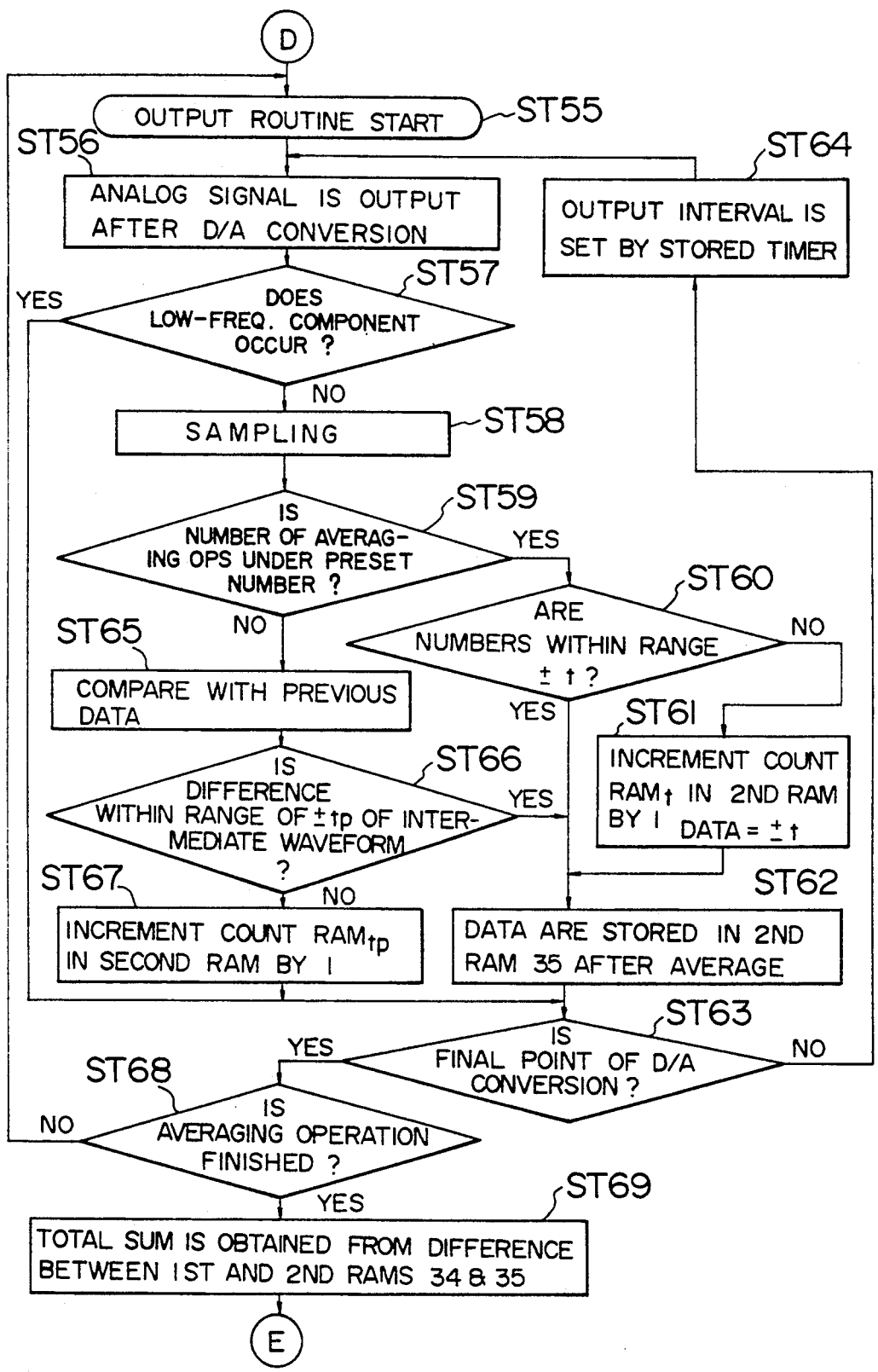
Figure 13C:
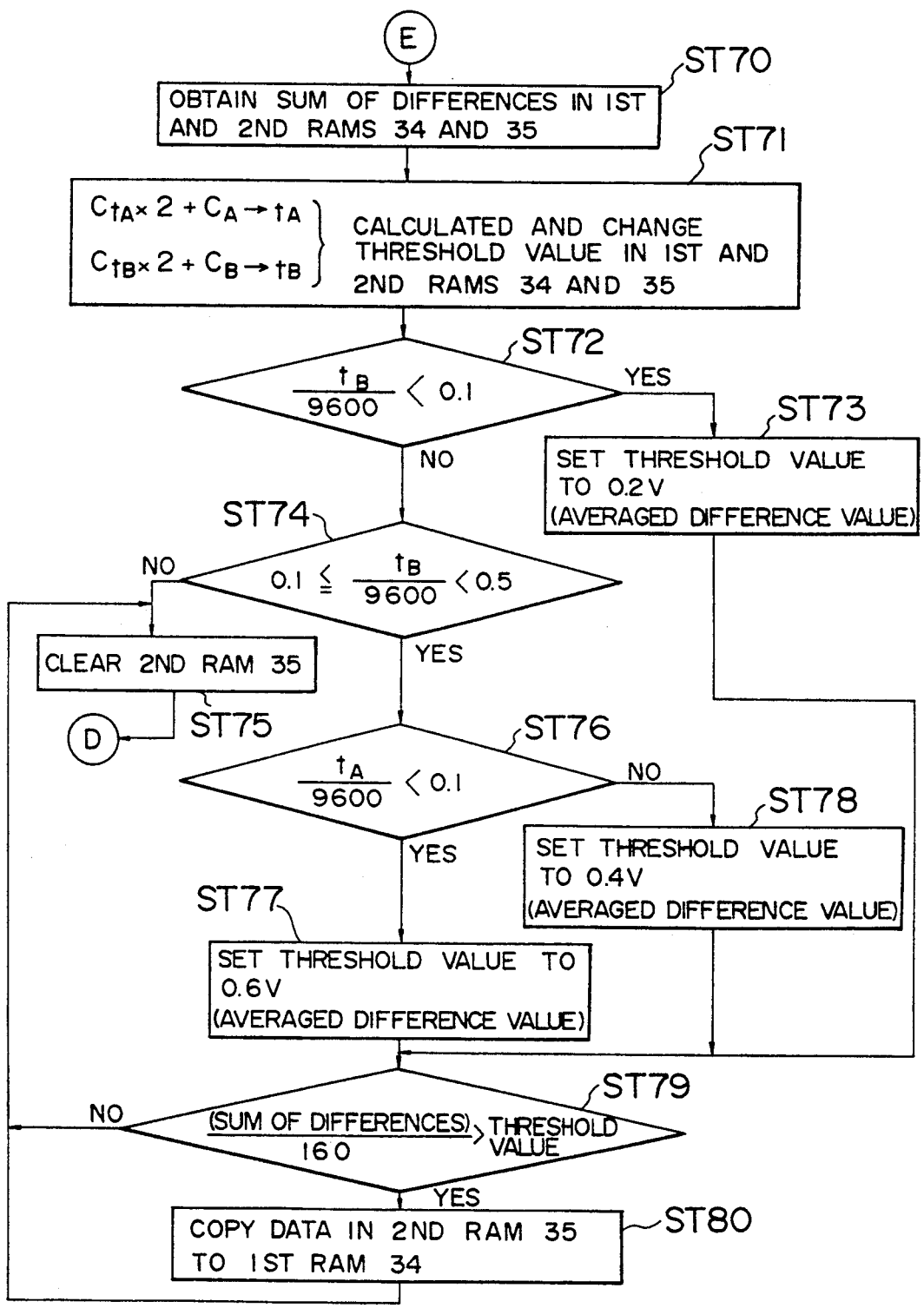

FIGS. 13A to 13C are flow charts showing the second embodiment procedure wherein the number of sampling points at which the data exceeds the threshold values t and tp is counted, and if the number exceeds a predetermined value, the value of the error judgment threshold value Vth is changed.

Figure 6A:
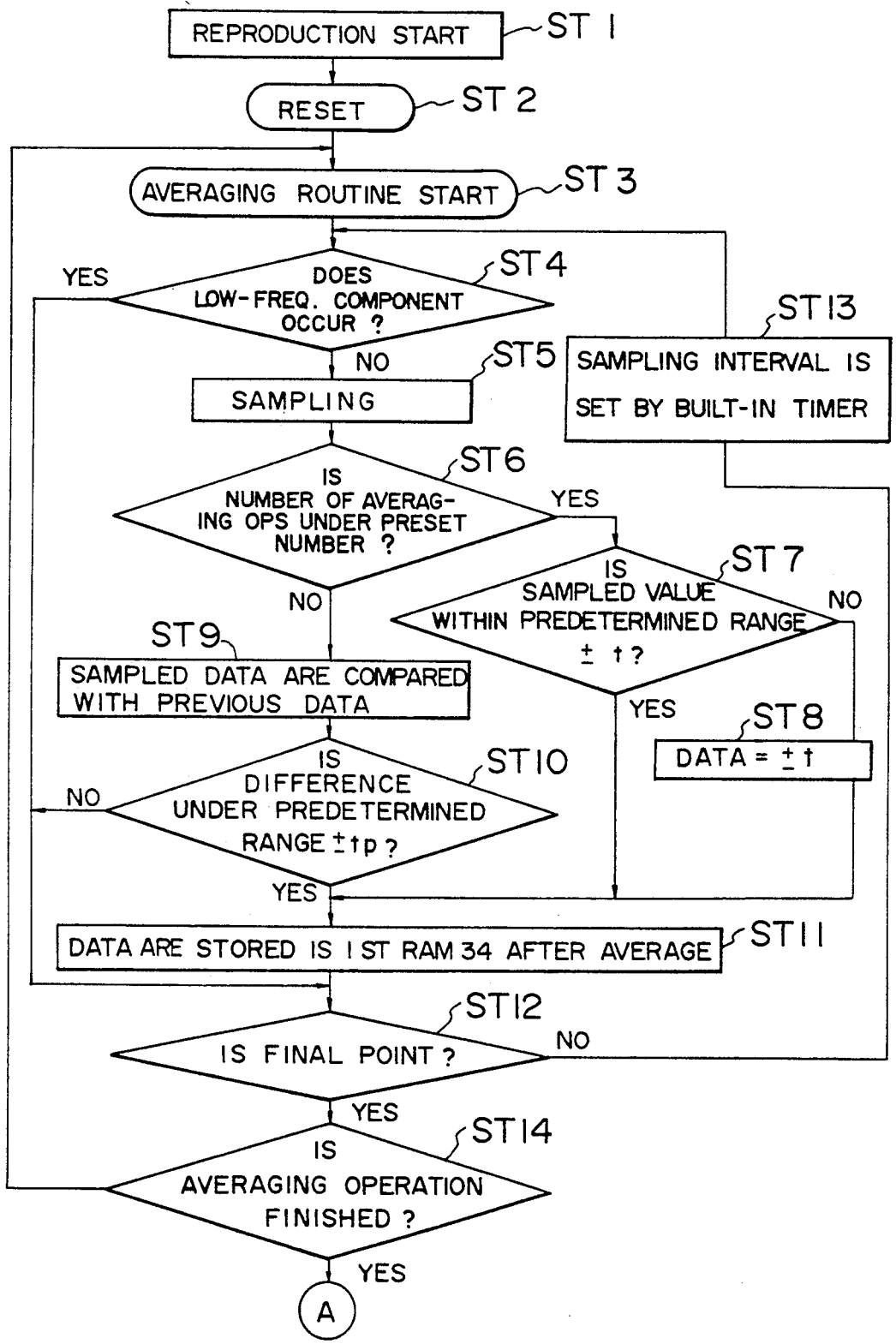
FIGS. 6A and 6B are flow charts illustrating the operation procedure a microcomputer constituting the main part of the apparatus of the first embodiment.

Steps ST41 to ST45 of FIG. 13A correspond to the steps ST1 to ST14 of FIG. 6A. The steps ST55 to ST69 of FIG. 13B correspond to the steps ST15 to ST29 of FIG. 6B. there are additionally provided steps ST47 and ST61 for counting the number of sampling points at which the data exceeds the threshold value t, steps ST51 and ST67 for counting the number of sampling points at which the data exceeds the threshold value tp, and the procedure shown in FIG. 13C.

For the averaged data stored in the first RAM 34, the number of sampling points at which the data exceeds the threshold value t is stored in an area RAMt$_A$, and the number of sampling points at which the data exceeds the threshold value tp is stored in an area RAMt$_A$. Similarly, for the averaged data stored in the second RAM 35, the number of sampling point at which the data exceeds the threshold value t is stored in an area RAMt$_B$, and the number of sampling points at which the data exceeds the threshold value tp is stored in an area RAMt$_B$. The count $C_{tA}$ in RAMt$_A$ multiplied by 2 is added to the count $C_A$ in RAMtA$_A$, and the result is stored as t$_A$, whereas the count $C_{tB}$ in RAMt$_B$ multiplied by 2 is added to the count $C_B$ in RAMt$_B$, and the result is stored as t$_B$ (steps ST703 and ST71). It is assumed that the number of rotations of the rotary head is 10 for the data limiting values of $+/-$ t and that for the data limiting values of $+/-$ tp is 40. As described previously, assuming that the number of sampling points per one rotation of the rotary head is 160, the total number of sampling points becomes 1600 for the data limiting values of $+/-$ t, and 6400 for the data limiting values of $+/-$ tp. In this case, considering the significant influence of the data obtained at the initial stage of the system operation, the data at the initial stage is weighted by a two-fold, so that the data is considered as having been sampled $1600 \times 2 + 6400 = 9600$ times.

If two 8-bit RAMs are used, the number of countable sampling points becomes 65,536. This value corresponds about 400 times as large as 160 sampling points per one rotation of the rotary head, so that such RAMs are sufficient in capacity for this embodiment.

Next, the value t$_B$ in the second RAM 35 is divided by the virtual sampling number 9600 to check if the result is smaller than 0.1 (step ST72). Namely, it is checked if the number of data limited sampling points is smaller than 10%. If smaller than 10%, it is considered as a high reliability of data so that the threshold value for the sum of differences is set lower, such as at 0.2 V (step ST73). The data in the second RAM 35 is used for the judgment of the data reliability because the data is newer than that in the first RAM 34.

On the other hand, if the number of data limited sampling points is larger than 10%, it is then checked if the number is smaller than 50% (step ST74). If the number exceeds 50%, it is considered as a low data reliability and the contents of the second RAM 35 are cleared (step ST75). If smaller than 50%, the value t$_A$ in the first RAM 34 is divided by the virtual sampling number 9600 to check if the result is smaller than 10% (step ST76). If smaller than 10%, the data reliability is high during the averaging routine so that the threshold value is set higher, e.g., to 0.6 V (step ST77). If larger than 10%, the data reliability is middle so that the threshold value is set at a middle level, e.g., to 0.4 V (step ST78).

Next, the sum of differences stored in the second RAM 35 is divided by the sampling point number 160 to compare the result with a threshold value Vth (step ST79). If the result does not exceeds the threshold value Vth, the contents of the second RAM 35 are cleared (step ST75). If it exceeds the threshold value Vth, the contents of the second RAM 35 are copied to the first RAM 34 (step ST80).

By properly changing the threshold value Vth in accordance with the reliability of extracted noises, it is possible to prevent erroneous operations which might otherwise be caused by audio signals or other noises.

The threshold value Vth may be changed not only in accordance with the ratio of limited data sampling points, but also in accordance with the number of rotations having a sampling point at which the data exceeds the threshold values t and tp.

Figure 14:
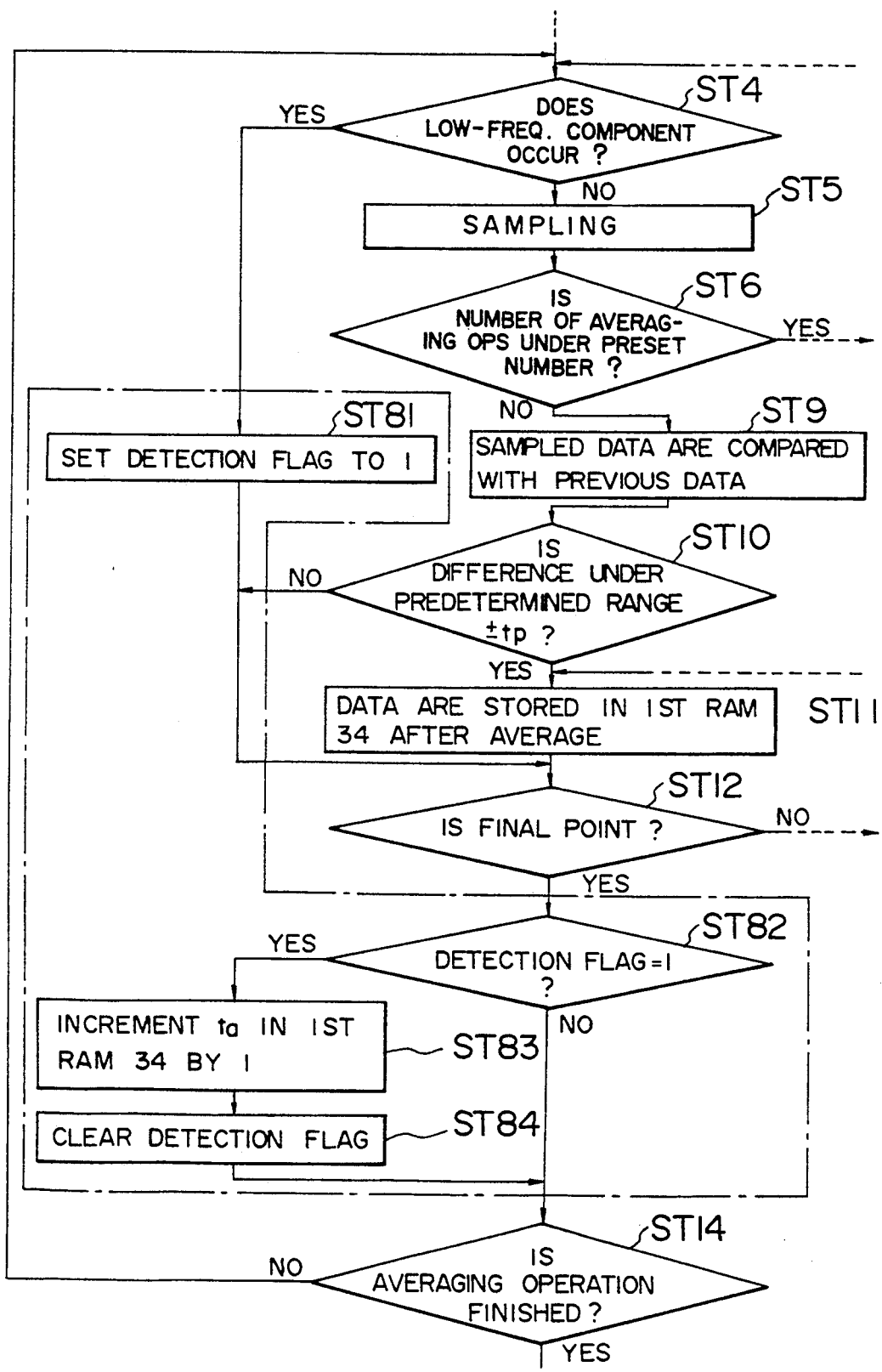
FIG. 14 is a part of a flow chart illustrating the operation procedure by a microcomputer according to a modification of the second embodiment.

In the latter case, as shown in FIG. 14, the following steps are additionally provided. Namely, every time the low frequency components exceed the threshold value during the averaging routine, a detection flag is set to 1 (step ST81). Every time the sampling operations for one rotation of the rotary head are completed, the value t$_A$ in the first RAM 34 is incremented by 1 (steps ST82 and ST83), and thereafter the detection flag is cleared to 0 (step ST84). Although the output routine is omitted in FIG. 14, the value t$_B$ in the second RAM 35 is incremented by 1. In the above processes, if an audio signal is detected once or more during one rotation of the rotary head, the data obtained during one rotation of the rotary head is considered as having a low reliability. The reason for this is that even if the signal level increases, a time of several msec will lapse until the level increase is detected, and during this time signals not correlated to jitter noises are picked up.

Figure 15:
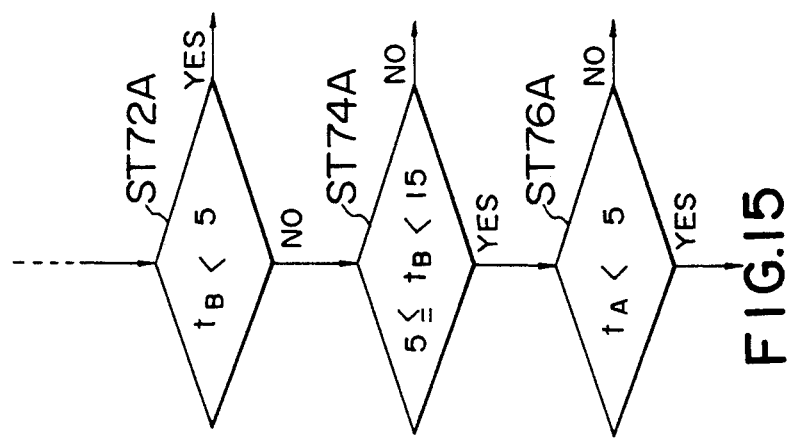
FIG. 15 is a part of a flow chart illustrating the operation procedure by a microcomputer according to a third embodiment of the present invention which is a modification of the second embodiment.

To deal with the above problem, in the procedure for changing the threshold value Vth according to the third embodiment shown in FIG. 15, the averaging operation continues until the rotary head has rotated 50 times. Instead of the steps ST72, ST74 and ST76 shown in FIG. 13C, it is checked if the value $t_B$ is smaller than 5 (step ST72A), it is checked if the value $t_B$ is larger than 15 (step ST74A), and it is checked if the value $t_A$ is smaller than 5 (step ST76A).

In the above manner, the threshold value can be changed in accordance with the number of rotations of the rotary head containing a data limited sampling point. According to this method, the capacity of RAMs may be made small.

Figure 16:
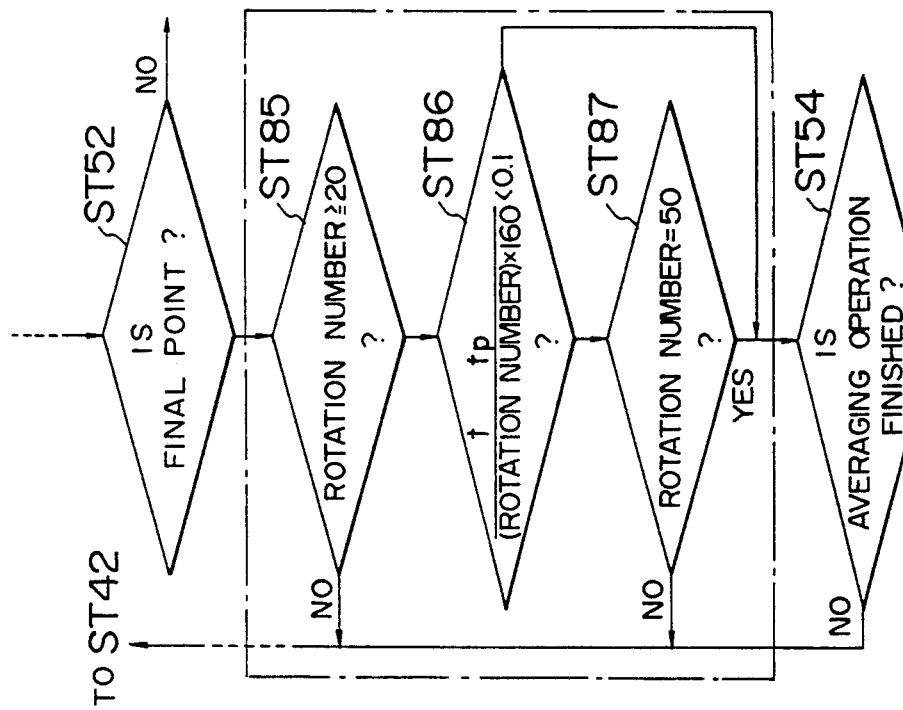
FIG. 16 is a part of a flow chart illustrating the operation procedure by a microcomputer according to a fourth embodiment of the present invention which is a modification of the second embodiment.

In the first to third embodiments, the averaging operation continues until the rotary head has rotated 50 times. The minimum number of rotations necessary for the averaging operation may be set to 20, and after the rotation of 20 times, it may be checked if the averaging operation continues or not in accordance with a presence/absence of data reliability. FIG. 16 shows an example of such a procedure according to the fourth embodiment.

According to this method, the judgment processes are performed at steps ST85, ST86 and ST87 between the steps ST52 and ST54 shown in FIG. 13A. Since the number of averaging operations is made smaller when the data reliability is high, the system can run at a high speed.

Figure 17:
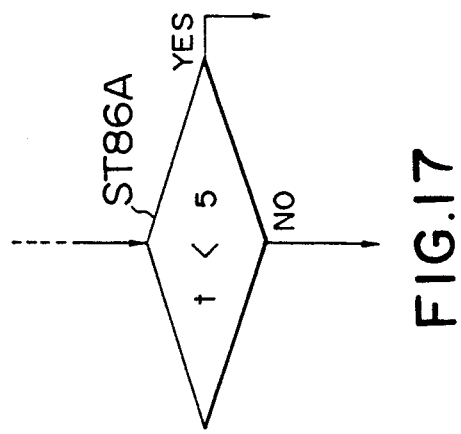
FIG. 17 is a part of a flow chart illustrating the operation procedure by a microcomputer according to a fifth embodiment of the present invention which is a modification of the second embodiment.

In the fourth embodiment shown in FIG. 16, a ratio of the number of virtual sampling points to the number of data limited sampling points is used at step ST86 for the judgment of the data reliability. Instead of the step ST86, as shown in the fifth embodiment shown in FIG. 17, the number of minimum rotations necessary for the averaging operation may be set to 20, and it may be checked if the number of data limited rotations is 5 or larger (step ST86A). Namely, the averaging operation terminates when the number of data limited rotations is 4 or smaller.

In the first to fourth embodiments, jitter noises are eliminated using a signal reproduced by one magnetic head. In a general Hi-Fi recording/reproducing apparatus, one magnetic head is used for recording right and left channel FM audio signals at the same time. Therefore, jitter noises in the reproduced signals have characteristics similar to each other. In this case, noises depend on the carrier frequency ratio. For example, the VHS carrier frequency ratio is right channel (1.7 MHz)/left channel (1.3 MHz)=2.33 dB, the right channel having more noises. In such a case, one of the right and left reproduced signals is used for the above-described processing, and the averaged data is outputted in accordance with this ratio.

Figure 18:
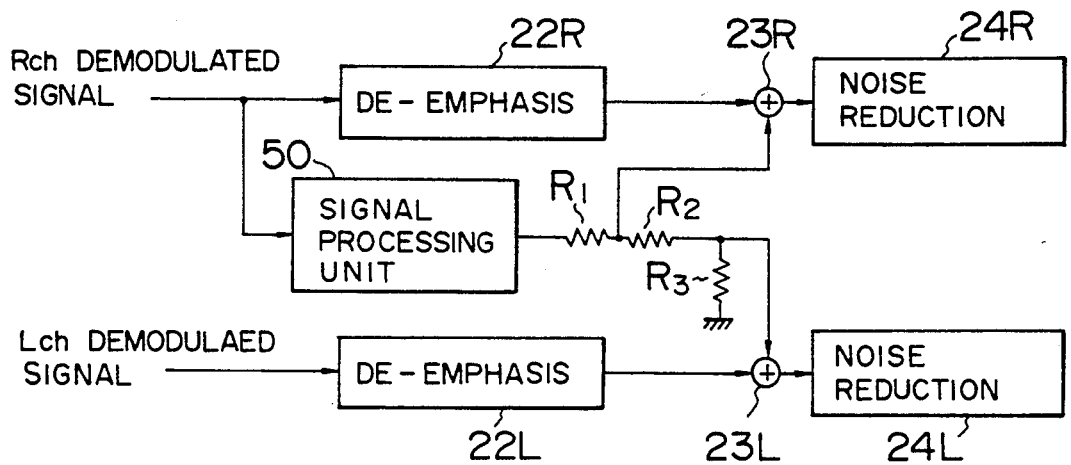
FIG. 18 is a block diagram showing the structure of a noise reduction apparatus according to a sixth embodiment of the present invention.

FIG. 18 shows the sixth embodiment wherein jitter noises are eliminated using one of the right and left reproduced noises. A right channel reproduced signal is processed by a signal processing unit 50 to extract averaged jitter noises which are then divided by resistors R1, R2, and R3 and applied to right and left channel adders 23R and 23L.

With the above circuit arrangement, there is not necessary to provide a signal processing unit for each channel.

Figure 19:
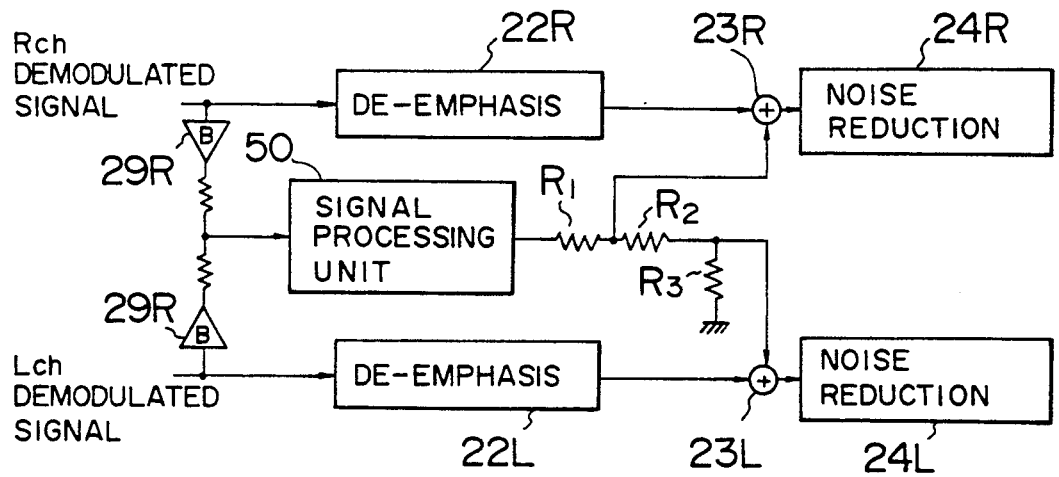
FIG. 19 is a block diagram showing the structure of a noise reduction apparatus according to a seventh embodiment of the present invention.

If the right and left channel noises are added together, correlated jitter noises are doubled, and not correlated audio signals and other noises are increased by a root 2. Therefore, the relative dynamic range of jitter noises is broadened so that signal processing becomes easy. FIG. 19 is a block diagram of a circuit for such a case, according to the seventh embodiment. The right and left channel reproduced signals are added together using buffers 29R and 29L. The obtained data is processed by a signal processing unit 50 and divided by resistors R1, R2, and R3 to apply the divided signals to adders 23R and 23L.

With the above circuit arrangement, signal processing can be made with a high reliability.

In the first to seventh embodiments, a recording/reproducing apparatus is used by way of example. The present invention is not limited thereto, but almost all reproducing apparatuses can be applied.

Referring back to FIG. 10, a so-called head tapping phenomenon will occur at the central portions (B1, B2) sandwiched between signal edges of the drum flip-flop DFF, and the time axis fluctuates in a pulse form. The reason for this will be described with reference to FIGS. 12A and 12B. V1 and V2 represent a video head, AU1 and AU2 represent an audio head, and FE1 and FE2 represent a rotary erase head. The rotary cylinder having the heads disposed in such a manner operates in the following manner. For example, while the AU1 head scans a tape while in contact with it, the FE1 head and then V2 head start scanning the tape while in contact with it. On the other hand, while the AU1 head scans a tape while in contact with it, the FE2 and V1 head sequentially detach from the tape. Since the magnetic heads are mounted on the rotary cylinder slightly extending therefrom, the relative speed between the audio signal heads and the tape fluctuates in a pulse form while the other heads become in contact with the tape or separated from the tape. If an audio signal is reproduced by using a VTR having a rotary cylinder with a different head arrangement, the time axis may fluctuate in a pulse form.

The time axis fluctuation may occur not only in the case where different VTRs are used between recording and reproducing, but also in the case where there is a change of environments such as temperature and humidity where the tape has been stored. Furthermore, the time axis fluctuation may occur not only in the case where video and audio signals are recorded and reproduced using different heads, but also in the case where they are recorded and reproduced using the same head.

As a result, noises can be detected with less error even if the averaging operation is performed, for example, at 20 points during one period including A1, B1, C1, A2, B2, and C2, i.e., even if the capacity of the second RAM 35 is reduced.

Figure 20A:
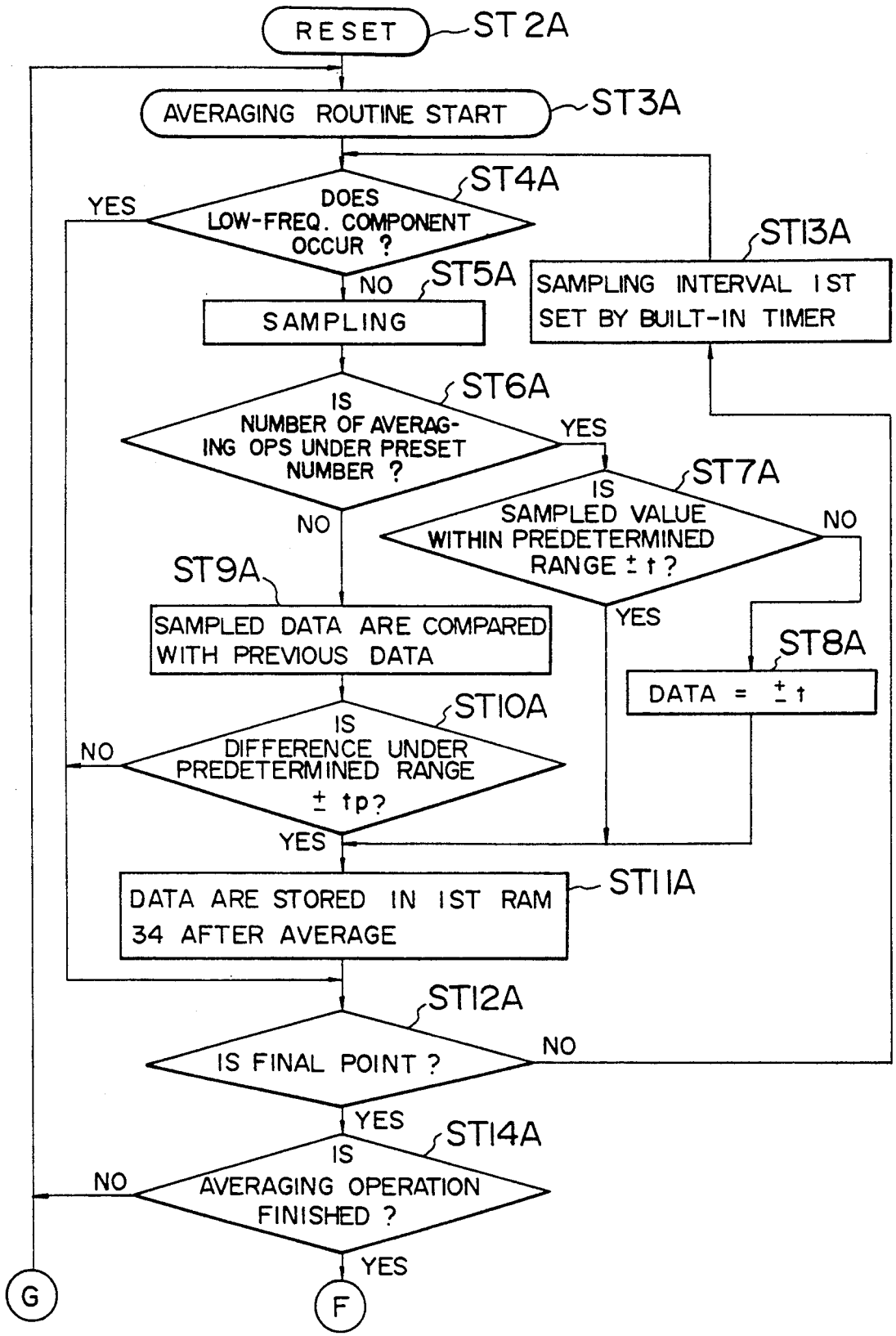
FIGS. 20A and 20B are flow charts illustrating the operation procedure by a microcomputer constructing the main part of a noise reduction apparatus according to an eight embodiment of the present invention.
Figure 20B:
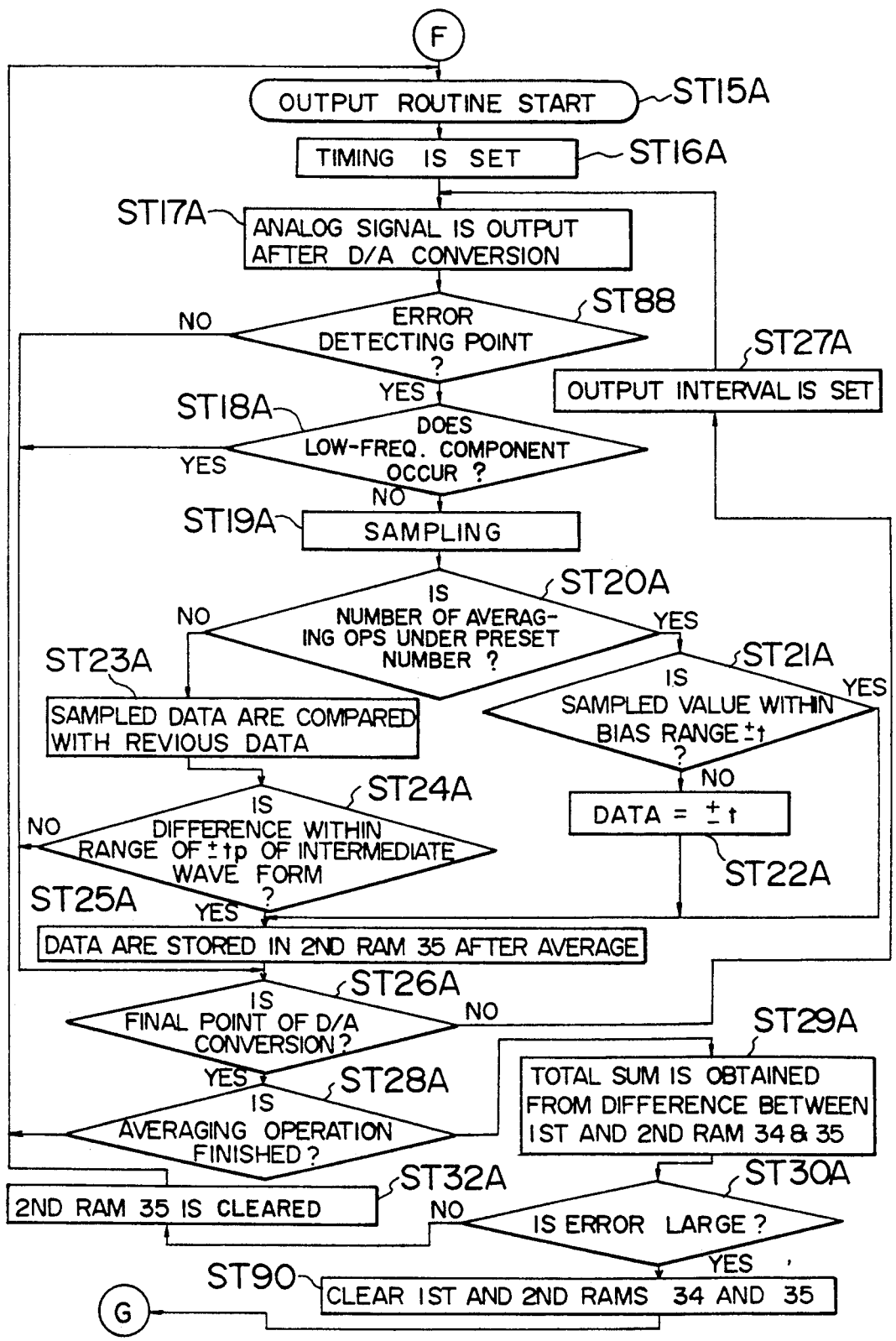

FIGS. 20A and 20B are flow charts illustrating a modification of the procedure of the microcomputer 30 serving as a calculation circuit for use in detecting noises in the manner described above, according to the eighth embodiment. The operation of the eighth embodiment will be described below with reference to the flow charts.

Figure 6B:
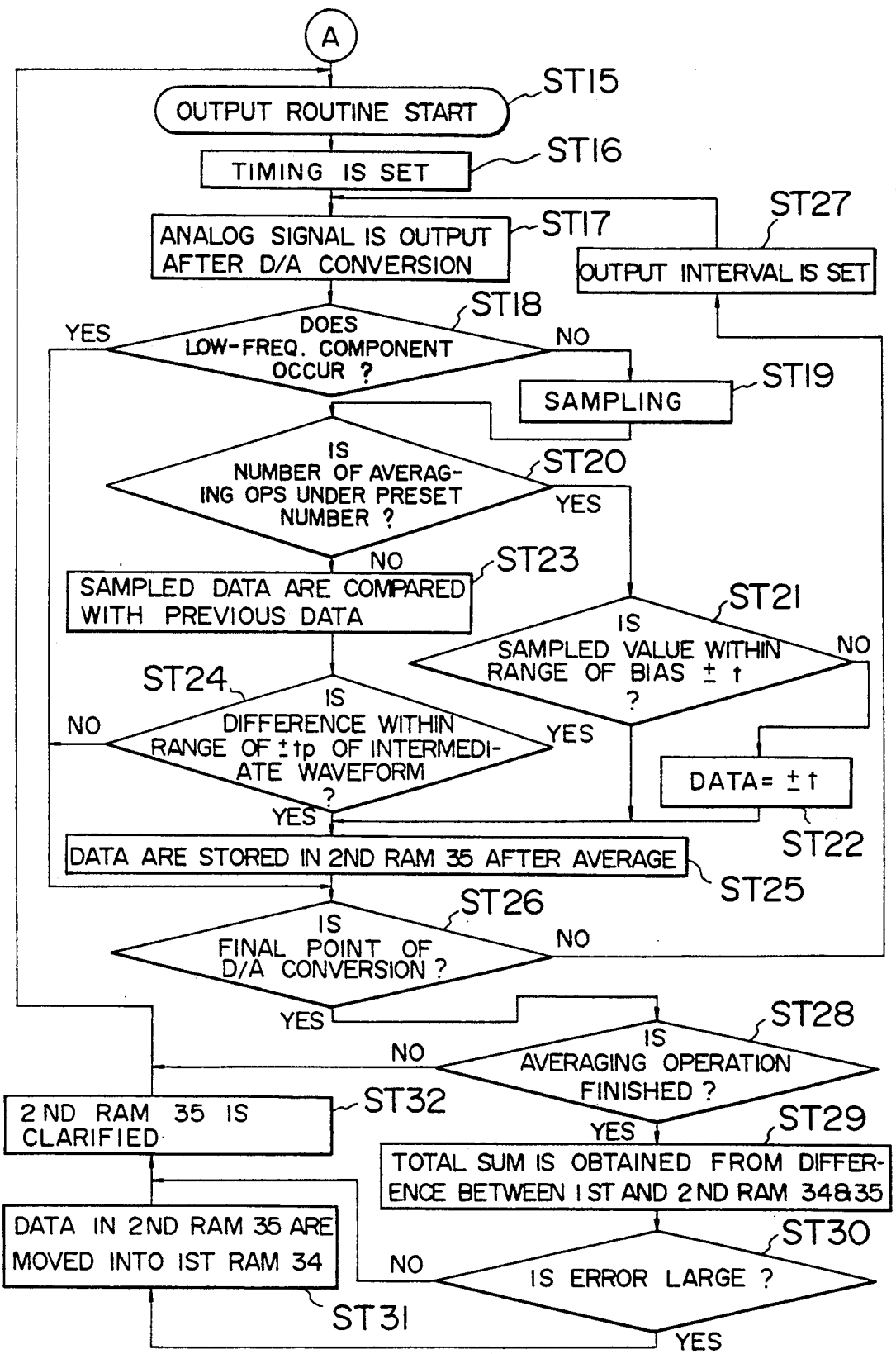

In FIGS. 20A and 20B, steps ST2A to ST17A are the same as the steps ST2 to ST17 shown in the flow charts of FIGS. 6A and 6B, so the description therefor is omitted.

At step ST17A, the data stored in the first RAM 34 is read, and at step ST88 it is checked if the current timing is for any one of the error detecting points including A1, B1, C1, A2, B2, and C2.

If not at step ST88, the control jumps to step ST26A. If affirmative at step ST88, the sum of differences between the data read from the first RAM 34 and sampled values at the error detecting points including A1, B1, C1, A2, B2, and C2 is calculated at steps ST18A to ST29A, similar to the steps ST18 to ST29 of FIG. 6B.

At the next step ST30A, it is checked if the calculated sum exceeds the threshold value. If not, it is considered that the latest jitter noises have substantially the same jitter noise pattern as that of the previous jitter noises. Therefore, the data stored in the second RAM 35 is cared and the control operation is reset to repeat the steps ST15A to ST17A, ST88 and ST18A to ST29A.

If it is judged that the sum exceeds the threshold value at step ST30A, it is considered that the jitter noise pattern has changed. The data stored in the first and second RAMs is cleared (step ST90) and the control returns to step ST3A to repeat the similar processing described above.

With the above processing, if jitter noise pattern changes, a noise canceling signal can be changed correspondingly, allowing an optimum noise reduction. Furthermore, with a noise reduction apparatus performing the processing described with FIGS. 20A and 20B, the points at which the averaging operations is carried out are limited to a small number where noise generation can be most probably anticipated. Therefore, the capacity of the second RAM 35 used in the microcomputer 30 serving as a control circuit can be reduced.

In the above embodiment, at step 29A the sum of differences between the latest jitter noise data stored in the second RAM 35 and the previous jitter noise data stored in the first RAM 34 is calculated at each of the same addresses. A jitter noise pattern change may be determined in such a manner that a difference between the latest jitter noise and the previous jitter noise at the same address is compared with a threshold value, and when the number of points at which the difference exceeds the threshold value becomes in excess of a certain value, it is considered that the change has occurred.

Figure 21A:
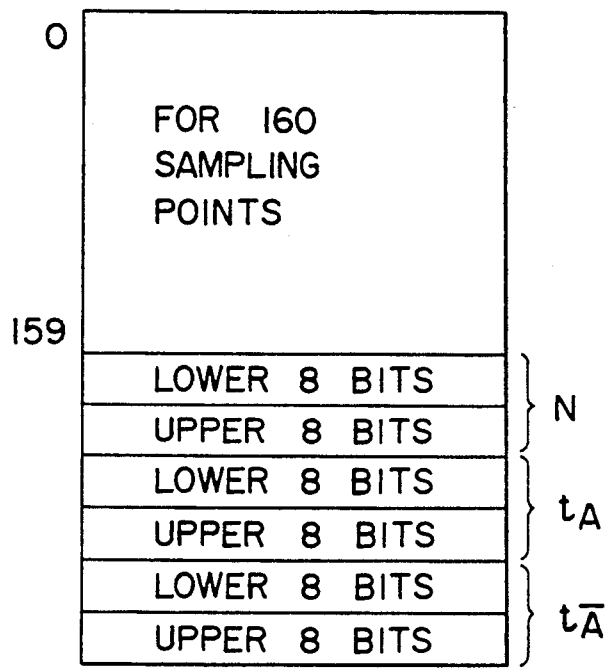
FIGS. 21A and 21B are schematic diagrams illustrating RAMs constituting the eight embodiment apparatus.
Figure 21B:
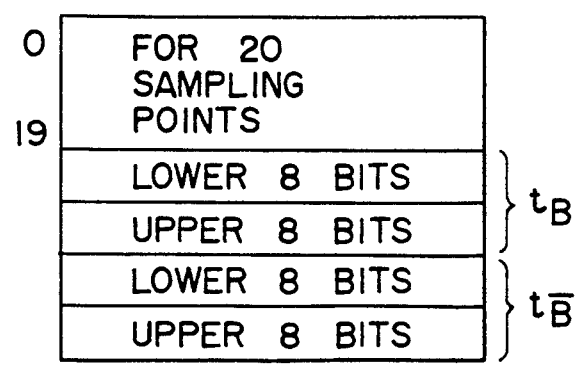

FIGS. 21A and 21B are memory maps for the first and second RAMs 34 and 35, respectively, in the eighth embodiment. In the first RAM 34, the storage area from address 0 to address 159 is used for storing 160 sampled data, and 48 (=6×8) bit area is reserved for counting the number of times of the averaging operations, the $t_A$ and $t_A$. In the second RAM 35, the area from address 0 to address 19 is used for storing the limited 20 sampled data, and 32 bit area is reserved for counting the $t_B$ and $t_B$.

I claim:

1. A noise reduction apparatus for use with a magnetic reproducing apparatus wherein a signal FM modulated and recorded on a recording medium is reproduced using a rotary head and FM modulated to pick up a reproduced audio signal, comprising:
    a first filter for extracting low frequency components from said reproduced audio signal;
    level detection means for detecting whether a level of said low frequency components extracted by said first filter is less than or equal to a first threshold level;
    averaging means which comprises first means for sampling said low frequency components at a sampling point synchronous with the rotation of said rotary head during a period while a level of said low frequency components extracted by said first filter is less than or equal to said first threshold level, second means for converting said low frequency components sampled by said first means into digital data, third means for averaging said digital data for a predetermined number of rotations at each of said sampling points, fourth means for continuing averaging said digital data if a difference between said low frequency components sampled by said first means and said digital data averaged by said third means is less than or equal to a second threshold value, and fifth means for converting said digital data averaged by said third means obtained during a period corresponding to a predetermined number of rotations of said rotary head into an analog signal which is output at a timing corresponding to said sampling point, thereby averaging said low frequency components;
    a second filter for removing high frequency components from said analog signal; and
    means for subtracting a signal obtained from said second filter from said audio signal.

2. A noise reduction apparatus according to claim 1, wherein said averaging means comprises first and second RAMs for storing said averaged digital data obtained during said period corresponding to said predetermined number of rotations, wherein said first RAM stores said averaged digital data previously obtained during said period corresponding to said predetermined number of rotations in accordance with said first and second threshold values (t and tp), said previous averaged digital data being converted into said analog signal which is then outputted, while said analog signal is outputted, said second RAM stores said averaged digital data presently obtained during said period corresponding to said predetermined number of rotations in accordance with said first and second threshold values (t and tp), the sum of differences between said previous digital data stored in said first RAM and said present digital data stored in said second RAM at each of said sampling points is calculated, the contents of said second RAM are copied to said first RAM if said sum exceeds an error judgment threshold value (Vth), and the contents of said second RAM are cleared if said sum takes said error judgment threshold value (Vth) or lower.

3. A noise reduction apparatus according to claim 2, wherein said averaging means counts the number of said sampling points at which said sampled digital data exceeds said first and second threshold values (t and tp), and if the counted number exceeds a third threshold value (m), said error judgment threshold value (Vth) is changed.

4. A noise reduction apparatus according to claim 2, wherein said averaging means counts the number of rotations of said rotary head at which said sampled digital data exceeds said first and second threshold values (t and tp), and if the counted number exceeds a fourth threshold value (n), said error judgment threshold value (Vth) is changed.

5. A noise reduction apparatus according to claim 1, wherein said rotary head reproduces a plurality channels of modulated signals at the same time, said noise reduction apparatus further comprises a plurality of said subtraction means provided for each of said channels, and level adjusting means for adjusting said signal obtained from said second filter and supplying said adjusted signal to each of said subtraction means, and said audio signal of one of said channels is supplied to said averaging means via said first filter.

6. A noise reduction apparatus according to claim 1, wherein said rotary head reproduces a plurality channels of modulated signals at the same time, said noise reduction apparatus further comprises means for adding together said plurality channels of reproduced and demodulated signals, a plurality of said subtraction means provided for each of said channels, and level adjusting means adjusting said signal obtained from said second filter and supplying said adjusted signal to each of said subtraction means, and an output of said adding means is supplied to said averaging means via said first filter.

7. A noise reduction apparatus according to claim 1, comprising:
   a low-pass filter for extracting low frequency components of a reproduced FM demodulated signal;
   a level detector for detecting a level of an output signal from said low-pass filter and generating a binary control output in accordance with whether said detected level is equal to or higher than a predetermined level or said detected level is lower than said predetermined level;
   a timing signal generator for generating a timing signal synchronous with the rotation of a rotary head;
   a processing circuit comprising first to fifth means, said first means responsive to said control output corresponding to a level lower than said predetermined level supplied from said level detector, operating to sample an output signal level from said low-pass filter at said timing signal from said timing signal generator while limiting said output signal within a first level range, to convert said sampled signal into a digital data, and to store in a first memory the result of an averaging operation between previously and presently sampled and converted said digital data at each sampling point during a period until a predetermined number of timing signals has been entered, said second means operating, after said predetermined number of timing signals has been entered and if a difference between said result of said averaging operation obtained from said first means and said digital data sampled at the following sampling signal from said timing signal generator is within a second level range narrower than said first level range, to store in said first memory the result of an averaging operation between previously and presently sampled and converted said digital data; said third means responsive to said control output corresponding to a level lower than said predetermined level supplied from said level detector, operating to sample an output signal level from said low-pass filter at said timing signal from said timing signal generator while limiting said output signal within said first level range, to convert said sampled signal into a digital data, and to store in a second memory the result of an averaging operation between previously and presently sampled and converted said digital data at each sampling point during said period until said predetermined number of timing signals has been entered, said fourth means operating, after said predetermined number of timing signals has been entered and if a difference between said result of said averaging operation obtained from said third means and said digital data sampled at the following sampling signal from said timing signal generator is within said second level range narrower than said first level range, to store in said second memory the result of an averaging operation between previously and presently sampled and converted said digital data, and said fifth means operating, if a difference between the data stored in said first and second memories is large, to copy said data in said second memory to said first memory;
   a converter for reading said result of an averaging operation stored in said first memory of said processing circuit at said timing signal from said timing signal generator, and converting said read-out signal into an analog signal; and
   a synthesizing circuit for synthesizing a signal from said converter with said reproduced FM modulated signal to thereby reduce noise components contained in said FM modulated signal.

8. A noise reduction apparatus according to claim 7, wherein said processing circuit calculates a difference value between said data stored in said first and second memories at each sampling point synchronous in phase with the rotation of a rotary head, and if there is a predetermined number or more of said calculated difference values at which said difference value exceeds a particular threshold value, said data in said second memory is copied to said first memory.

9. A noise reduction apparatus according to claim 7, wherein said processing circuit calculates a difference value between said data stored in said first and second memories at each sampling point synchronous with said timing signal, if the sum of said difference values exceeds a particular threshold value, said data in said first and second memories is reset, and said first to fourth means are caused to repetitively execute a predetermined operation.

10. A noise reduction apparatus according to claim 7, wherein said processing circuit calculates a difference value between said data stored in said first and second memories at each sampling point synchronous with said timing signal, and if there is a predetermined number or more of said difference values exceeding a particular threshold value, said first to fourth means are caused to repetitively execute a predetermined operation.

* * * * *